(12) United States Patent
Walker

(10) Patent No.: US 8,604,641 B2
(45) Date of Patent: Dec. 10, 2013

(54) RENEWABLE ENERGY DELIVERY SYSTEMS AND METHODS

(75) Inventor: Howard Andrew Walker, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 12/808,510

(22) PCT Filed: Feb. 13, 2009

(86) PCT No.: PCT/US2009/034145
§ 371 (c)(1),
(2), (4) Date: Jun. 16, 2010

(87) PCT Pub. No.: WO2009/103020
PCT Pub. Date: Aug. 20, 2009

(65) Prior Publication Data
US 2011/0227417 A1    Sep. 22, 2011

Related U.S. Application Data

(60) Provisional application No. 61/028,576, filed on Feb. 14, 2008.

(51) Int. Cl.
*H02J 1/00* (2006.01)
*H02J 3/00* (2006.01)

(52) U.S. Cl.
USPC ............................................................ 307/72

(58) Field of Classification Search
USPC ...................................... 307/72, 80; 700/295
See application file for complete search history.

(56) References Cited

U.S. PATENT DOCUMENTS

| 2003/0042798 | A1 | 3/2003 | Chang et al. |
| 2003/0167105 | A1 | 9/2003 | Colborn |
| 2006/0276938 | A1* | 12/2006 | Miller ........................... 700/295 |

FOREIGN PATENT DOCUMENTS

| KR | 10-1999-0061968 A | 7/1999 |
| KR | 10-2008-0006028 A | 1/2008 |

OTHER PUBLICATIONS

International Search Report dated Oct. 6, 2009, for International Application No. PCT/US2009/034145.
International Preliminary Report on Patentability and Written Opinion of the International Searching Authority, dated Oct. 6, 2009, for International Application No. PCT/US2009/034145.
International Preliminary Report on Patentatibility and Written Opinion for International (PCT) Application No. PCT/US2009/03145, issued Aug. 17, 2010.

* cited by examiner

*Primary Examiner* — Carlos Amaya
(74) *Attorney, Agent, or Firm* — W. LaNelle Owens; Paul J. White; John C. Stolpa

(57) ABSTRACT

A system, method and/or apparatus for the delivery of energy at a site, at least a portion of the energy being delivered by at least one or more of a plurality of renewable energy technologies, the system and method including calculating the load required by the site for the period; calculating the amount of renewable energy for the period, including obtaining a capacity and a percentage of the period for the renewable energy to be delivered; comparing the total load to the renewable energy available; and, implementing one or both of additional and alternative renewable energy sources for delivery of energy to the site.

18 Claims, 18 Drawing Sheets

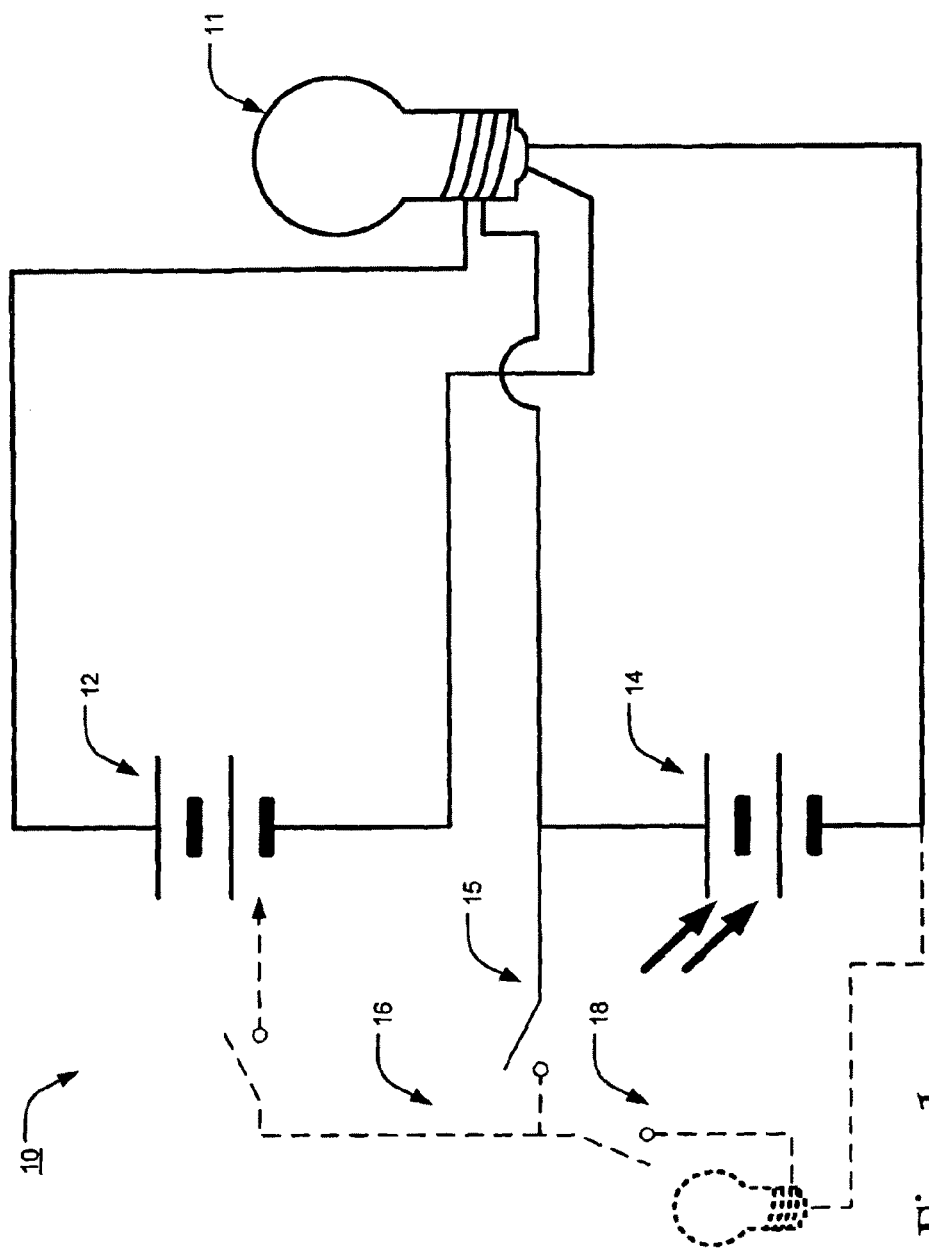

RENEWABLE ENERGY DELIVERY SYSTEMS AND METHODS

CROSS REFERENCE TO RELATED APPLICATIONS

The present application claims priority from the U.S. Provisional Application No. 61/028,576, filed 14 Feb. 2008; the subject matter of which hereby being specifically incorporated herein by reference for all that it discloses and teaches.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

It may readily be understood and not difficult to calculate the energy delivery (kWh) at a particular site of an individual renewable energy technology based on a renewable resource, e.g., sun, wind or biomass, inter alia. However, when considering the supply of a periodic, e.g., annual, load at a site, and incorporating there the implementation of more than one energy supply source, particularly when, for example, implementing multiple renewable technologies, a complication is to account for the interactions between the multiple energy systems, renewable or otherwise, relative to the load. In particular, there may be times when some renewable energy, whether from one or a combination of renewable sources, will be generated in excess of the load and may thus be credited at a lower value; but alternatively, often there will be times when some energy must be purchased from a utility because the renewable energy measures are not sufficient to meet the load.

SUMMARY

The following implementations and aspects thereof are described and illustrated in conjunction with systems, tools and methods which are meant to be exemplary and illustrative, not limiting in scope. In various implementations, one or more of the above-described issues have been reduced or eliminated, while other implementations are or may be directed to other improvements.

In view of the foregoing it is a general aspect of the presently described developments to provide a system and/or method for the delivery of energy at a site, at least a portion of the energy being delivered by at least one or more of a plurality of renewable energy technologies, the system, apparatus and/or methodologies for such delivery of energy including determining a total load value for the site for a period; determining a renewable energy value available for the same period; comparing the total load value to the renewable energy value over the period, and determining the adequacy of renewable energy delivery, and, the system including renewable energy apparatus for delivering the renewable energy to the site in response to the determination of the adequacy of energy delivery.

The foregoing specific aspects and advantages of the present developments are illustrative of those which can be achieved by these developments and are not intended to be exhaustive or limiting of the possible advantages which can be realized. Thus, those and other aspects and advantages of these developments will be apparent from the description herein or can be learned from practicing the disclosure hereof, both as embodied herein or as modified in view of any variations which may be apparent to those skilled in the art. Thus, in addition to the exemplary aspects and embodiments described above, further aspects and embodiments will become apparent by reference to the drawings and by study of the following descriptions.

BRIEF DESCRIPTION OF THE DRAWINGS

Exemplary implementations are illustrated in referenced figures of the drawings. It is intended that the implementations and figures disclosed herein are to be considered illustrative rather than limiting. In the drawings:

FIG. 1 is a schematic view of a site load energy system hereof including at least one renewable and one non-renewable source and a site load;

DETAILED DESCRIPTION

Figure 2A:
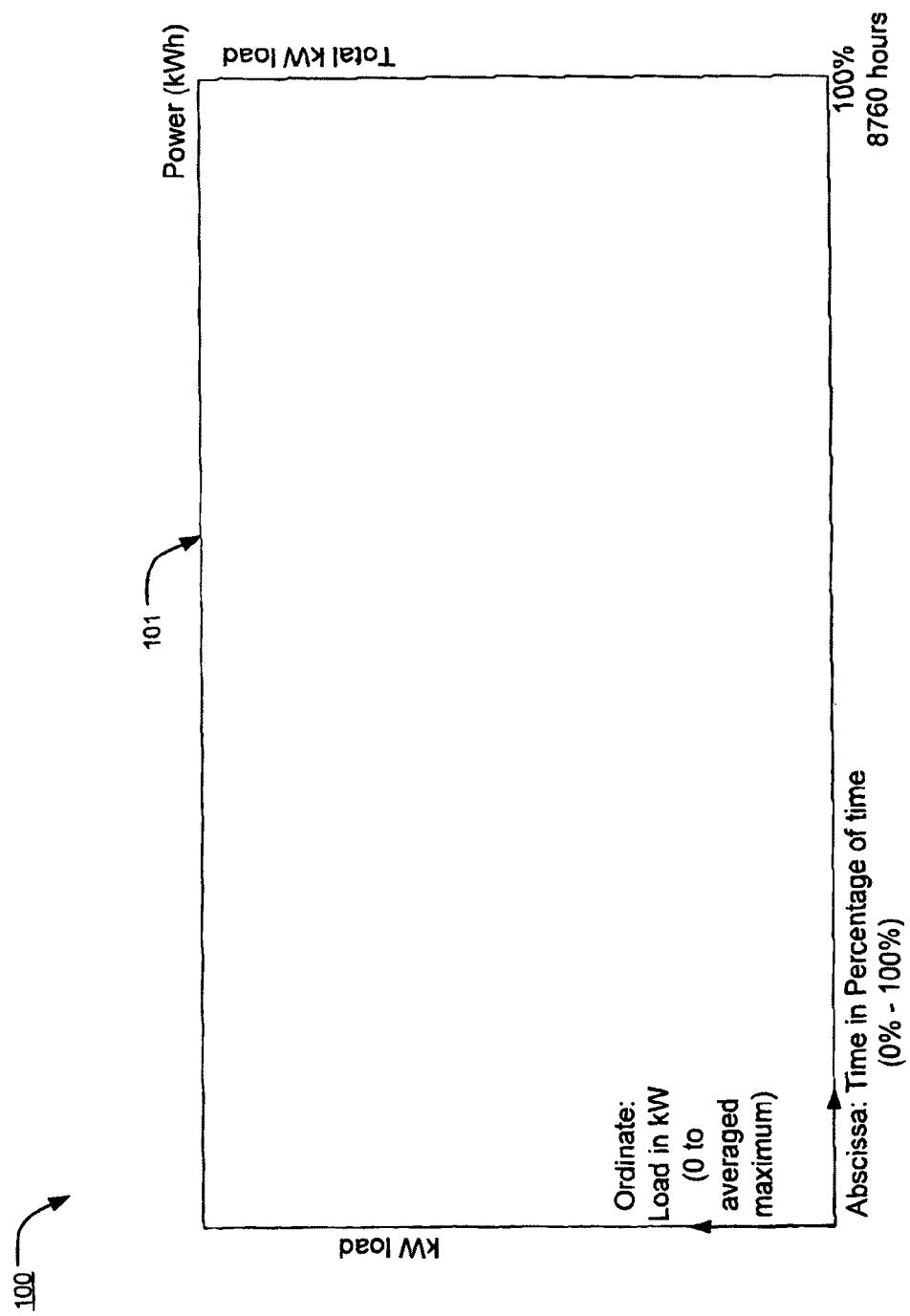
FIG. 2, which includes sub-part FIGS. 2a, 2b, 2c, 2d, 2e, and 2f, provides graphical views representing kilowatts (kW) versus time represented as a percent of time for load, and/or one or more of a plurality of energy sources.

Described here are, inter alia, methods and systems for delivering energy to a site to meet the site load. In particular, the methods and systems hereof provide, in some implementations, for determining whether and which renewable energy sources are to be implemented at or in relation to a site, and/or in determining how and when they are to be used, including accounting for the interactions of multiple renewable energy technologies in determination or estimation of periodic, e.g., annual, energy performance. Moreover, the present developments describe, in some implementations, methods and systems for determining and delivering the energy to meet a site load including delivery of energy from one or more renewable energy sources together with energy purchased from the utility or otherwise acquired from a non-renewable source and/or energy sold back to the utility or otherwise re-distributed to an off-load element when excess energy is produced from one or more of a possible plurality of renewable energy technologies are deployed at a site. The systems and methods may include use of a "Renewable Energy Optimization" (REO) to conduct least cost calculation, planning and implementation of renewable energy projects at a site.

Renewable energy projects may be evaluated at a particular site based on how much energy they deliver and/or conversely on how much they save. However, when more than one renewable energy technology is deployed at a site it may generally become desirable to account for the interactions between the multiple technologies. In a particular example, it is not possible to deliver or conversely save the same kWh twice, and it thus may become desirable to determine how much renewable energy is generated up to and/or in excess of a load and when in excess, supplied back to the serving utility under a net metering policy or as wholesale electric power. Similarly it may also become desirable to calculate how much of the load is served directly by the renewable energy systems and how much is purchased from the utility.

More particularly, a designated load (here, typically annualized, though other periods may be used) will present a particular kilo-watt-hour (kWh) consumptive demand, and one or more energy sources may be implemented to meet that demand, each such source providing respective quantities of kWh toward that demand. These sources may include a public utility source (natural gas and/or electric, inter alia); and one or more offsetting renewable energy sources. If plural renewable sources are used during any particular time periods, their contributions are aggregated; and if they come to less than the load or demand for those time periods, then, the public utility (or other non-renewable) source is used to make up the difference. However, if the aggregate of renewable energies meets or exceeds the load, the public utility source is either not used (when the renewable energies meet the load), or the public utility may be sold back the excess (even if but for only a short period of time).

In some implementations, the present developments may include a site load energy system, such as system 10 of FIG. 1 for the delivery of energy to a load, schematically shown at 11 in FIG. 1, at a site, at least a portion of the energy being delivered by one or more renewable energy technologies. The site load 11 presents a consumptive energy demand. The site load may be connected to a source, schematically shown at 12 in FIG. 1, of non-renewable energy for contribution to meeting the consumptive energy demand of the site load. Moreover, a renewable energy sub-system, see source 14 in FIG. 1 (shown as a photo-activated source by the two arrows; this being but one example of a renewable which could be used herewith), is connected to the site load for contribution to meeting the consumptive energy demand of the site load. The renewable energy sub-system 14 may also have an off-load connection 15 to deliver any energy in excess of the demand to an off-load element (see optional connections 16 and 18, for respectively providing excess power to an alternative source or grid, such as back to the provider of the non-renewable energy, and connection 18 to an alternative load). A hardware sub-system, not directly shown in FIG. 1, but implicated in the switches and connections of the sources 12, 14, 15, 16 and 18, is also included for obtaining a load value and a renewable energy value for the site load for a period. The renewable energy value includes a capacity and a percentage of the period for the renewable energy sub-system to deliver renewable energy. The hardware sub-system also provides for comparing the load value to the renewable energy value over the period using the capacity and percentage of the period for the renewable energy sub-system to meet, exceed or fail to fully meet the demand of the load, the hardware sub-system providing for one or more of delivery of renewable energy to the site load, and the acquisition of non-renewable energy from the non-renewable energy source, and the delivery of excess renewable energy generated to an off-load element.

This present developments make use of the interactions between the non-renewable and renewable sources, whether one or more renewable sources, to implement one or more energy delivery technologies through evaluations or calculations, typically based on annual averages. Using the term "integrate" as it is used in calculus, some typical "integrations" of power delivery from renewable energy installations with respect to time are shown in the attached drawings. The respective "integrations" or "integrals" are illustrated as the areas of the respective boxes in the attached figures; i.e., respective areas under the curve(s). Note, the rectangular boxes of FIGS. 2-10 provide a straightforward example, particularly in the respective calculations of the respective energy amounts delivered or to be delivered. Even so, alternative calculations, more or less complex may be used, as for example, using actual integrations of delivery over time, particularly where the energy delivered or to be delivered is not represented as a straight line/square cornered shape. That is, other methods for achieving the respective energy values can and are intended to be used within the systems and methods hereof.

Figures 2B, 2C:
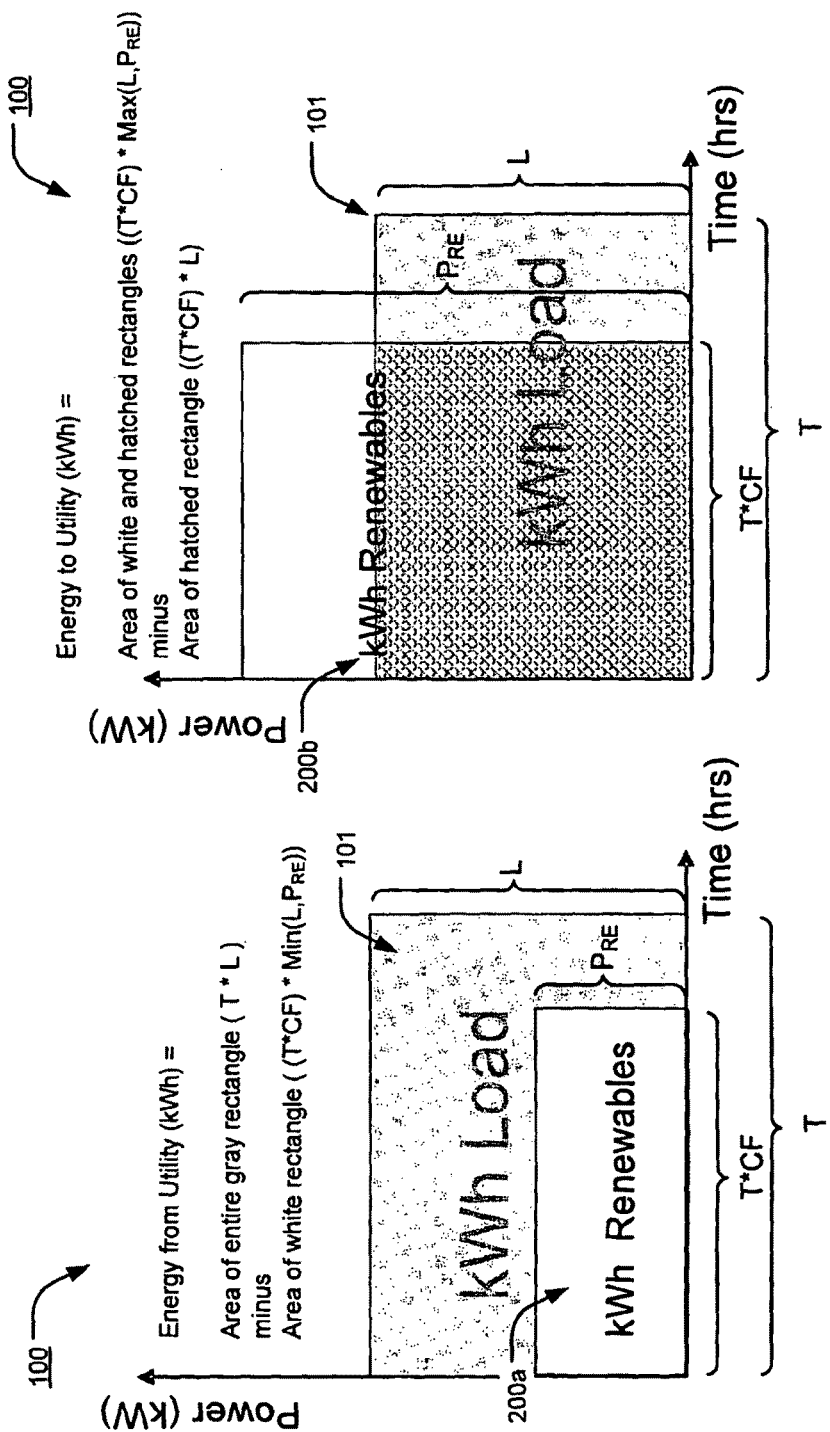
Figure 2D:
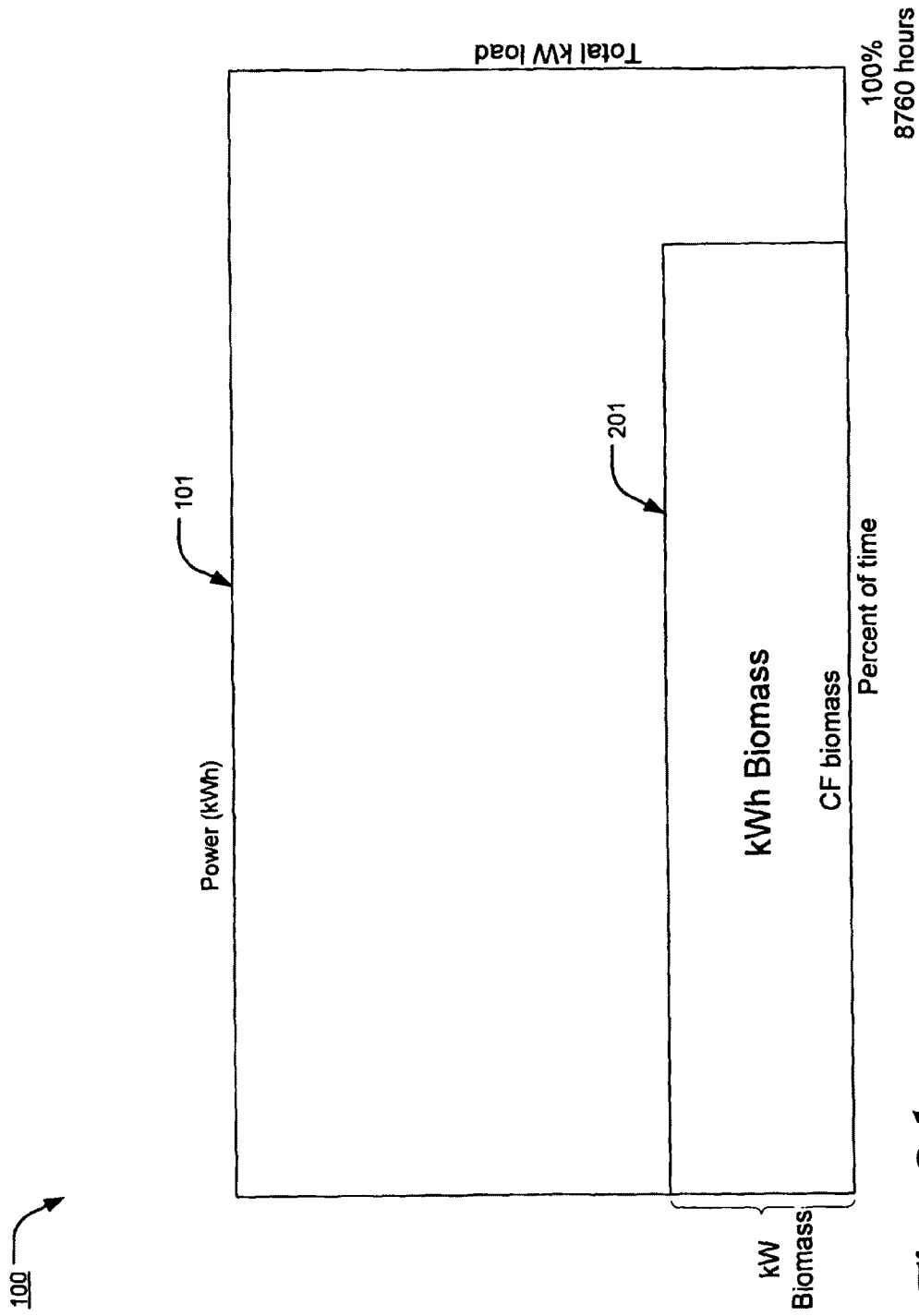
Figure 2E:
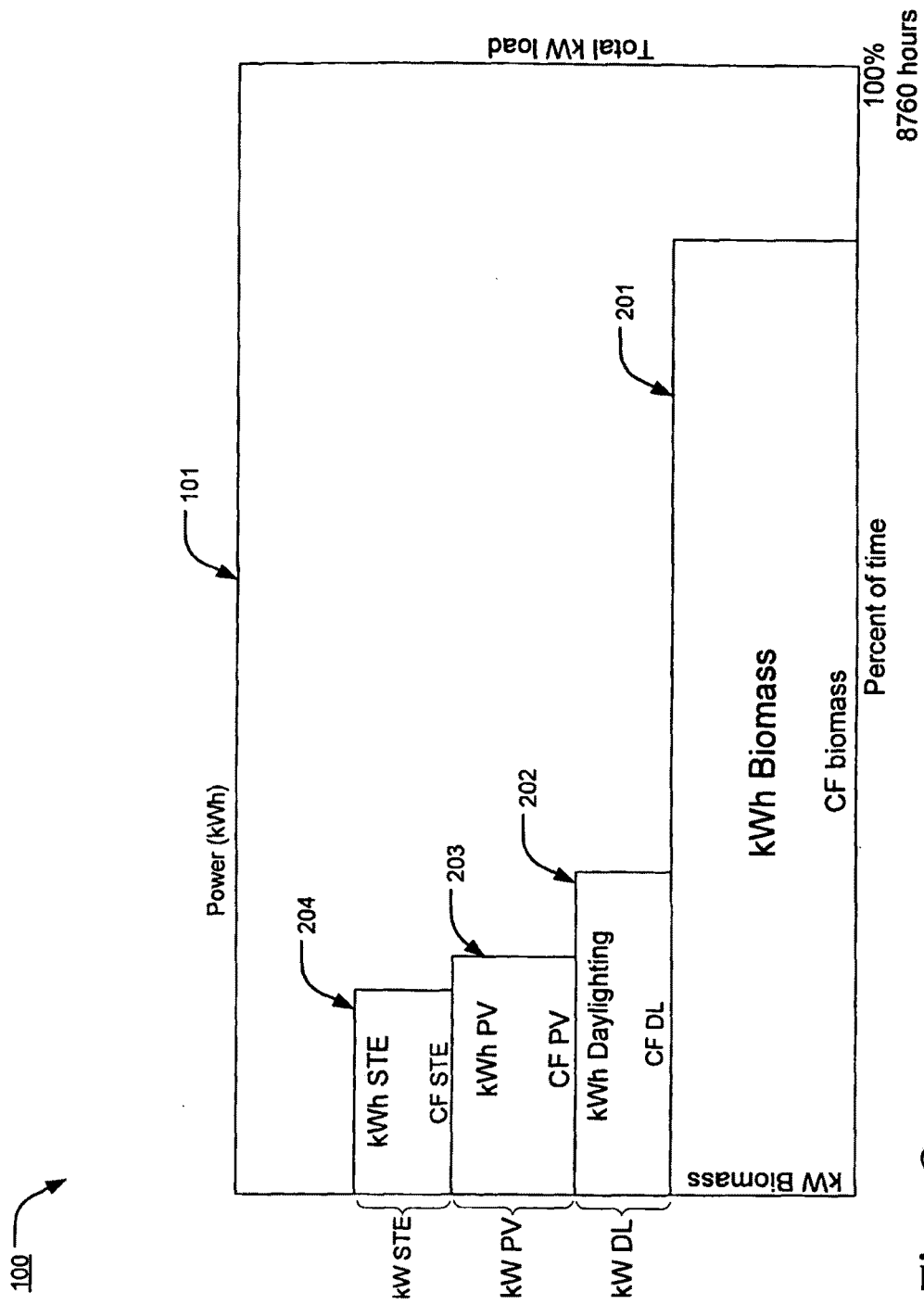
Figure 2F:
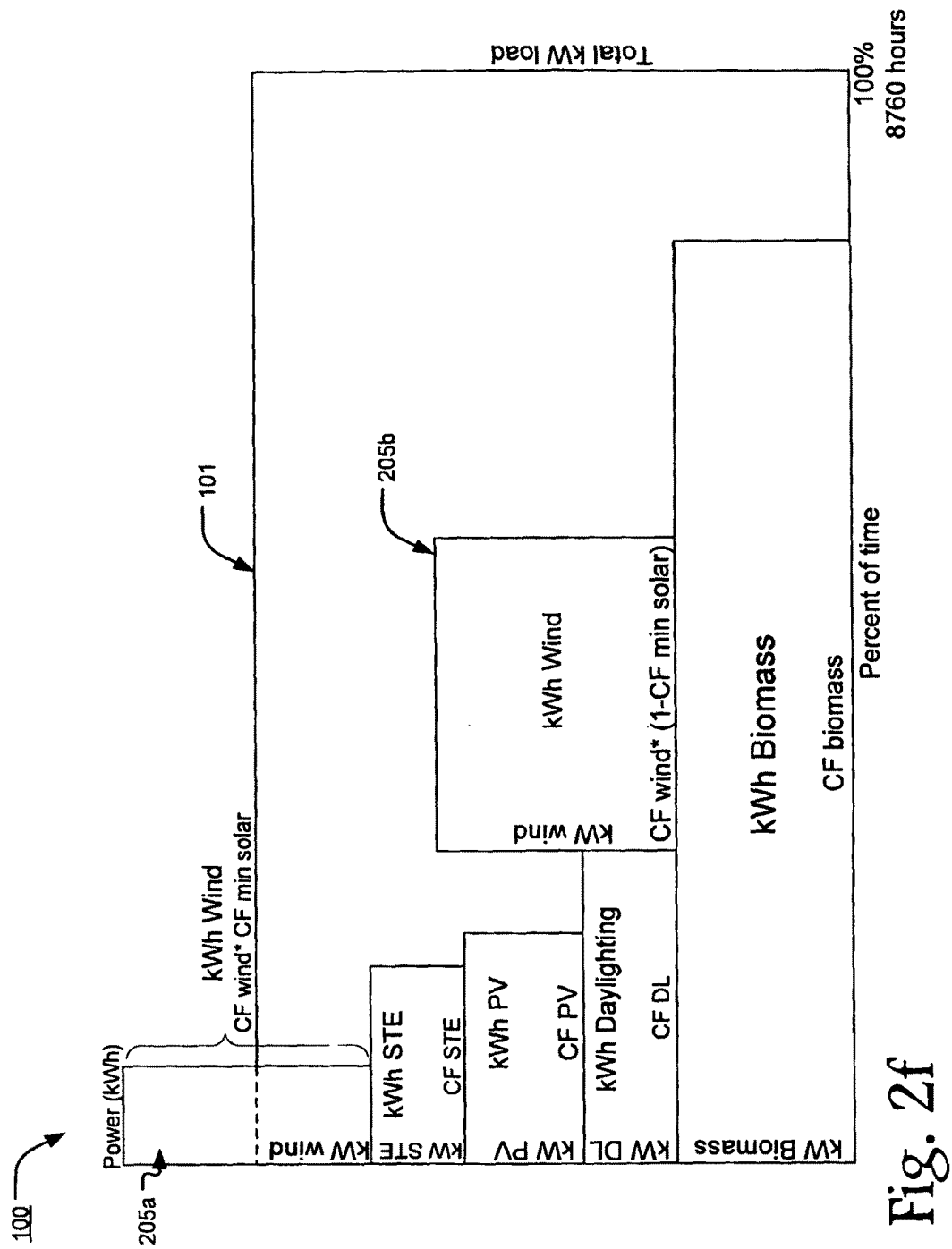

In the example of FIG. 2, and in its subsequent multiple manifestations, FIGS. 2a-2c, as well as in the subsequent FIGS. 2-10, a graph 100 presents one, two and/or several boxes, the overall background rectangle 101 (shown in all versions of FIG. 2-9, but, by itself in FIG. 2a) represents the total load or demand to be or being served by one or a combination of renewable energy and conventional utility power. In FIG. 2a, no renewable energy technologies are shown implemented, thus, the total load of the annualized consumption requirements would, in such instance, be met by public utility or other non-renewable power. In and per the developments hereof, at least some portion of this total is sought to be offset by renewables, see subsequent FIGs. and descriptions thereof. Such offsets are described according to the developments hereof. First, however, more particularly what is shown in FIG. 2a is the total energy delivery or power consumed (in kWh) which is represented by the rectangle with height proportional to the averaged power load (kW) for a period, here, one year, and the width being defined by 100 percent of time in this period, one year (i.e., 8760 hours). The product of the height times the width of this rectangle, i.e., the area within or the integral of the area under the curve defined by the rectangle is the total power in kWh for the load for the period, here, a year.

In the other sub-part FIGs. of FIG. 2, exemplars of some possibly usable renewable energies are shown. In particular, the energy delivery (kWh) of each of one or more or several representative renewable energy technologies is represented by a respective rectangle with height proportional to the rated capacity (kW) (capacity or power also referred to herein by the abbreviation P) for each technology and the width proportional to the capacity factor (also referred to herein by the abbreviation, CF), or percent of time that technology is delivering it's rated output. The product of the capacity by the capacity factor (and time period, see below) provides the area within the respective box which is also the energy (also referred to by the abbreviation E, herein) delivered or to be delivered over the period (kWh/year).

In FIGS. 2b and 2c, two more specific examples are shown where the entire periodized load 101 (kWh) is shown with two different examples of renewable energy contribution/offsets 200a and 200b. In both cases, the energy amounts 200a, 200b provided by the renewables (only a single amount of renewable energy contribution is shown in FIGS. 2b and 2c; more alternatives are shown in FIGS. 2-9) are available for only a percentage less than the entire Time, T, of the period of the load (i.e., total time of power delivery). This percentage is defined as capacity factor, CF (e.g., some percentage from 0-100%), of the renewable energy or energies provided, and thus contributes to defining a total time of renewable energy availability by multiplication times the entire time period of the graph, i.e., CF*T=total time of renewable energy availability/contribution, something generally less than, though potentially equal to (or more than) the total time of the particular period (note, as an example, if the time period were something more than a day, solar energy would be available not for the entire day due to darkness; although battery or other storage might offset this going forward to perhaps even longer than the period, T).

In FIGS. 2b and 2c, the vertical reach of the respective renewable energy boxes 200a, 200b are defined by the renewable energy power capacity, or $P_{RE}$ (Power of renewable energy); and are show respectively not meeting the demanded load, in FIG. 2b, box 200a, and alternatively exceeding the load, L, as shown in FIG. 2c, box 200b. thus, what are shown are two different examples, where in the first case, the total power of the renewables is less than the demand, and then, in the second example, exceeds the demand for at least a portion of time. From this, and as described below are the two scenarios wherein either power has to be obtained from a non-renewable source to meet the load, FIG. 2b, or power may be sold or otherwise credited or distributed to alternative uses as it exceeds the load, FIG. 2c. The comparisons for determining same are set forth briefly here, and in more detail throughout.

First, in the example of FIG. 2b, shown as the entire load is the product of the total time for power delivery, T, by the rated, averaged power requirement for the load, or height L; such that T*L=load in power delivered over time (e.g., kWh), and also is shown graphically as the area of the gray rectangle (including the area hidden by the white renewable rectangle which will offset as described below). This is substantially also the area, T*L, of the FIG. 2a rectangle 101. So to determine the offset by the renewable energy contribution, a straightforward subtraction of the renewable power value from the load amount will provide the energy thus needing to be obtained from a utility or other non-renewable source. In terms of the graph of FIG. 2b, this is the Energy from Utility (kWh)=Area of entire gray rectangle (T*L) minus Area of white rectangle ((T*CF)*$P_{RE}$), or, with a min function, ((T*CF)*Min(L,$P_{RE}$)), to obtain first a comparison of the $P_{RE}$ to the L; this is also:

$$Energy=(T*L)-((T*CF)*Min(L,P_{RE}));$$

where the min function, Min(L,$P_{RE}$), determines first which is less between the load, L, or the renewable power, $P_{RE}$, which, then if $P_{RE}$ is less, this is used and provides the area of the white rectangle subtracted from the gray rectangle of FIG. 2b. This is subtracted from the rectangular area T*L to provide the non-renewable energy to be obtained. Another way to refer to it is as: Energy from Utility (kWh)=Time (hrs)* [(Power to Load (kW))−Capacity Factor(%)*Min(Load, RE Capacity) (kW)].

In FIG. 2c, shown here also as the entire load is the product of the total time for power delivery, T, by the rated, averaged power requirement for the load, or height L; such that T*L=load in power delivered over time (e.g., kWh), and also is shown graphically as the area of the gray rectangle (including the hatched area, essentially hidden by the white renewable rectangle which will offset as described below). This is substantially also the area, T*L, of the FIG. 2a rectangle 101, as well as in FIG. 2b. So to determine the offset by the renewable energy contribution in this case, this is viewed initially as during the period of CF*T, a complete offset with indeed additional, excess renewable generation which will be sold to a utility or otherwise disposed of for credit or otherwise. Calculating this amount is also a straightforward subtraction, however, here it is of the total renewable contribution, from which is taken the amount used by the load. In terms of the graph of FIG. 2c, this is the Energy to Utility (kWh)=Area of entire white rectangle, hatched and non-hatched, ((T*CF)*$P_{RE}$) minus Area of hatched-only rectangle, ((T*CF)*L)), or with a max function, ((T*CF)*Max(L,$P_{RE}$)), to obtain first a comparison of the $P_{RE}$ to the L; this is also:

$$Energy=((T*CF)*Max(L,P_{RE}))-((T*CF)*L);$$

where the max function, Max(L,$P_{RE}$), determines first which is more between the load, L, or the renewable power, $P_{RE}$, which, then if $P_{RE}$ is more, this is used and provides the area of the white hatched and non-hatched combined rectangle from which is subtracted hatched-only rectangle of FIG. 2c. This subtraction of the hatched from the white rectangular area CF*T*$P_{RE}$ provides the renewable energy to be sold off or otherwise credited. Another way to refer to it is as: Energy to Utility (kWh)=Area of white and hatched rectangles ((T*CF)*Max(L,$P_{RE}$)) minus Area of hatched rectangle ((T*CF)*L); or also as Energy to Utility (kWh)=Time (hrs)*Capacity Factor (%)*[Max(Load, RE Capacity) (kW)− Power to Load (kW)].

Of course, in the right hand example of FIG. 2c, there is a credit of power to the utility for percentage of period of CF; however, there is yet also a period of T-CF that power needs to be obtained from the utility in the amount of L*(T−(T*CF)).

In a more specific example with a combination of renewable energies is provided in the remainder parts of FIG. 2 and those FIGs. following thereafter. In FIG. 2d, shown inside the total demand or load 101 is a rectangle 201 representing an amount of biomass (BM) energy which may be provided in a particular implementation. The height of rectangle 201 is the averaged output or power (P), the width the percentage of time (CF) available for delivery of power (shown here as something less than 100% of a full year). The product of the height times the width here also is the energy delivered (kWh) by one or more biomass alternatives. In FIG. 2e, three additional boxes are added to the exemplar implementation of FIGS. 1 and 2, these representing three types of solar power; daylighting (DL) 202, photovoltaic (PV) 203, and solar thermal electric (STE) 204. These also have a power total represented by an averaged output per a percentage of time available (note, the solar power alternatives are limited in time over an entire year by night time and by cloudy or other obstructed days). In FIG. 2f, two further boxes are added, wind (W) power 205a which is additive to the solar and biomass power operating periods (i.e., during daylight), and wind power 205b which is not additive to solar (e.g., at night or on cloudy days), but, additive to biomass. These wind power additions are also available for some time period less than 100% of an average year. Further details relative to these renewable energies will be explored further in the following FIGs.

The systems and methods hereof account for interactions, e.g., aggregations, between technologies in determining a periodized, e.g., annual, energy performance of multiple renewable energy technologies at a subject site (manufacturing plant, zoo, town, military base, etc.). A multi-parametric optimization may be included to determine the combination of renewable energy technologies that minimizes life cycle cost (e.g., (wind (w), solar thermal electric (step), photovoltaics (pv), daylighting (dl), and biomass (bm)). A calculation may be used to generate the kWh of electric energy that are or may be sold back to the utility and/or purchased from the utility as well as the power delivery relative to any net metering limits at the site. Referring to the attached FIGs., the energy delivery of each technology is represented as its capacity multiplied by its operating hours. The sum of the capacities (kW) of all the renewable energy systems operating concurrently is multiplied by the hours that those technologies are operating concurrently. These are the products of the horizontal and vertical extents of each of the rectangular boxes in FIGS. 2-9 yielding the respective areas of each rectangle thereby representing a particular amount of energy delivered or to be delivered. Operating hours are calculated according to the relationships which follow.

Load=Annual Electric Energy Use (kWh/year)
$E_{wind}=E_W$=Wind (W) Annual Energy Delivery (kWh/year)
$P_{wind}=P_W$=Wind (W) Capacity or Power (kW)
$E_{PV}$=Photovoltaic or PV Annual Energy Delivery (kWh/year)
$P_{PV}$=Photovoltaics (PV) Capacity or Power (kW)
$E_{STE}$=Solar Thermal Electric (STE) Annual Delivery (kWh/year)
$P_{STE}$=Solar Thermal (STE) Cogeneration Capacity or Power (kW)
$E_{BM}$=Biomass (BM) Annual Electric Delivery (kWh/year)
$E_{DL}$=Daylighting (DL) Annual Electric Savings (kWh/year)
$P_{BM}$=Biomass (BM) Cogeneration Capacity or Power (kW)
$CF_{wind}=E_{wind}/P_{wind}/8760=CF_W$=Capacity Factor for wind (percentage of time available)
$CF_{PV}=E_{PV}/P_{PV}/8760$=Capacity Factor for PV (percentage of time available)
$CF_{STE}=E_{STE}/P_{STE}/8760$=Capacity Factor for STE (percentage of time available)
$CF_{BM}=E_{BM}/P_{BM}/8760$=Capacity Factor for Biomass (percentage of time available)
$CF_{DL}=2500/8760$=Capacity Factor for Daylighting (percentage of time available)

Figure 3:
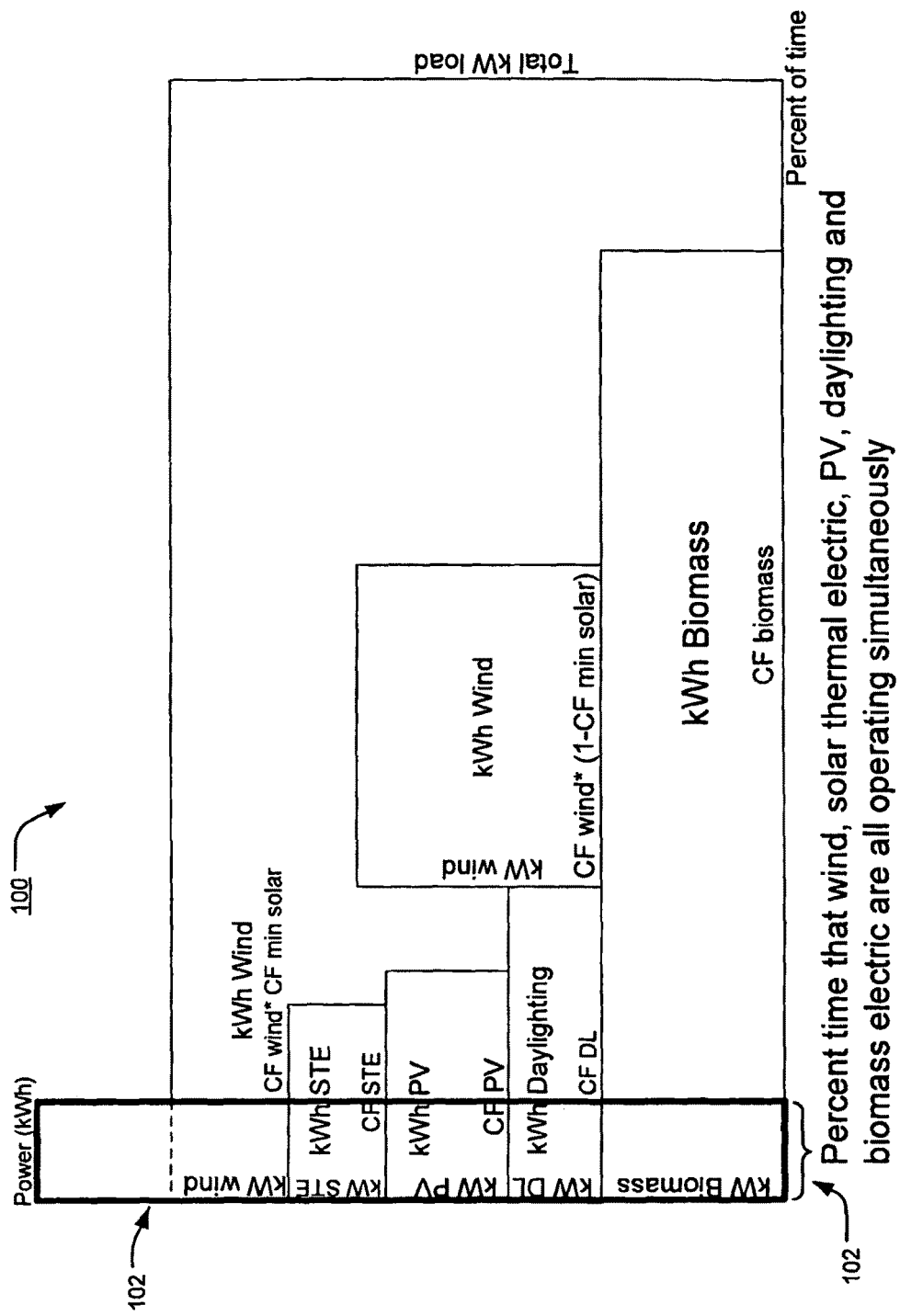
FIG. 3 is a graph like that of FIG. 2f highlighting a portion thereof to illustrate implementation of a methodology hereof.

In FIG. 3; highlighted as area 102 is the total percent of time that wind (W), solar thermal electric (STE), photovoltaics (PV), daylighting (DL) and biomass (BM) electric are all operating simultaneously. This may also be represented as:

$$\text{hours}_{W+DL+STE+PV+BM}=CF_{WIND}*((E_{PV}+E_{STE}+E_{DL})/(P_{PV}+P_{STE}+E_{DL}/(2500)+0.000001)/8760)*8760$$

The above equation calculates the hours of time that wind is coincident with photovoltaics, solar thermal electric and daylighting. The value 8760 is the total number of hours in a year. The value 2500 is the number of daylight hours in a year. The average capacity factor of the solar technologies is calculated as $*((E_{PV}+E_{STE}+E_{DL})/(P_{PV}+P_{STE}+E_{DL}/(2500)+0.000001)/8760)$ and this is multiplied by the capacity factor of wind to approximate the percentage of the time that wind is coincident with the solar technologies. The 0.000001 is just to keep it from dividing by zero while still allowing it to be negligibly small. Since no power rating (kW) is related to the daylighting, the power delivery associated with daylighting is estimated as $E_{DL}/(2500)$ based on a stipulated value of 2500 hours of sufficient daylight per year.

Figure 4:
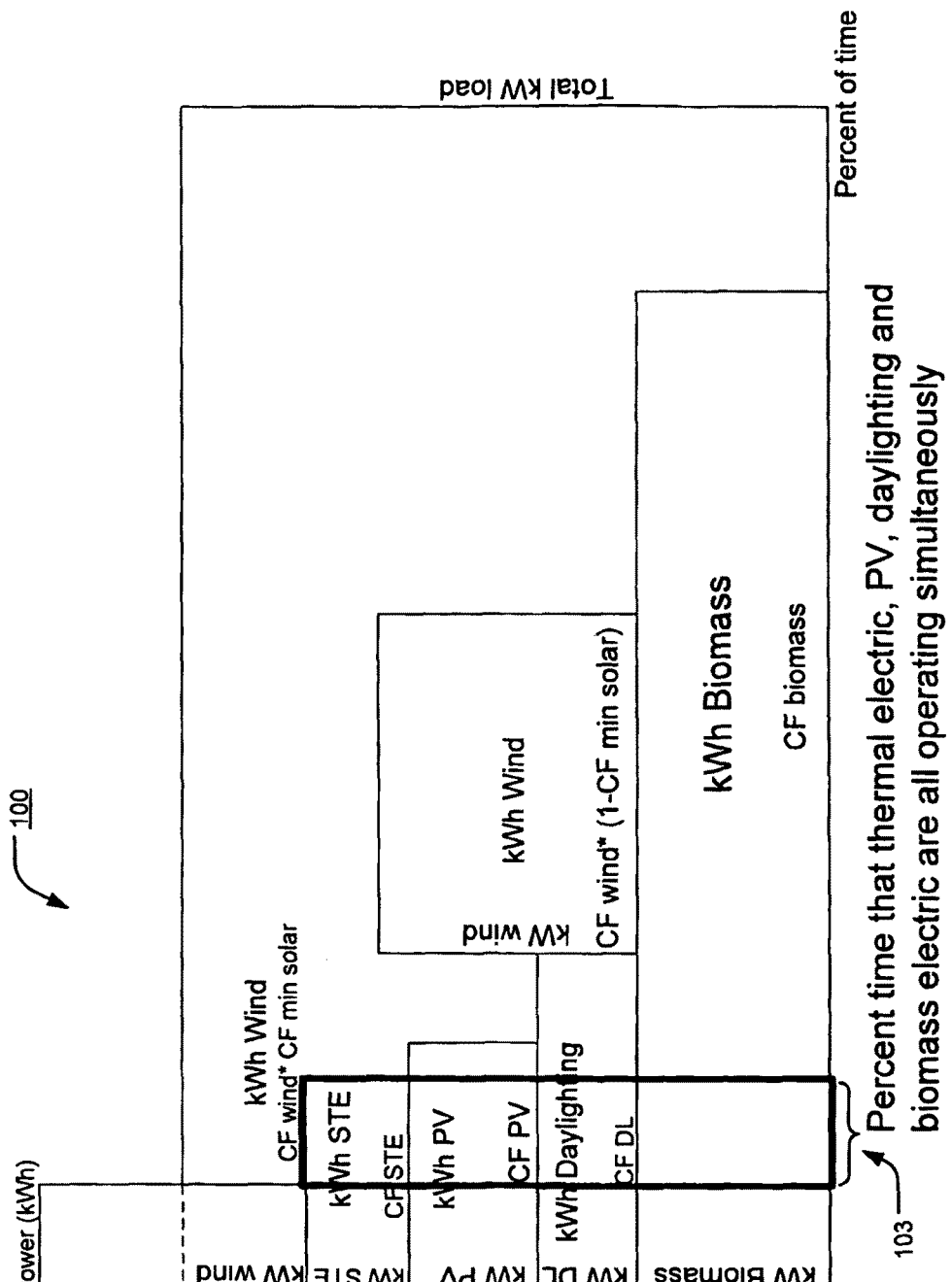
FIG. 4 is a graph like that of FIG. 2f highlighting another portion thereof.

In FIG. 4; highlighted as area 103 is the percent of time that solar thermal electric, PV, daylighting and biomass electric are all operating simultaneously. This may also be represented as:

$$\text{hours}_{STE+PV+DL+BM}=\text{MAX}(0,CF_{STE}*8760-[\text{hours}_{W+STE+PV+DL+BM}])$$

Figure 5:
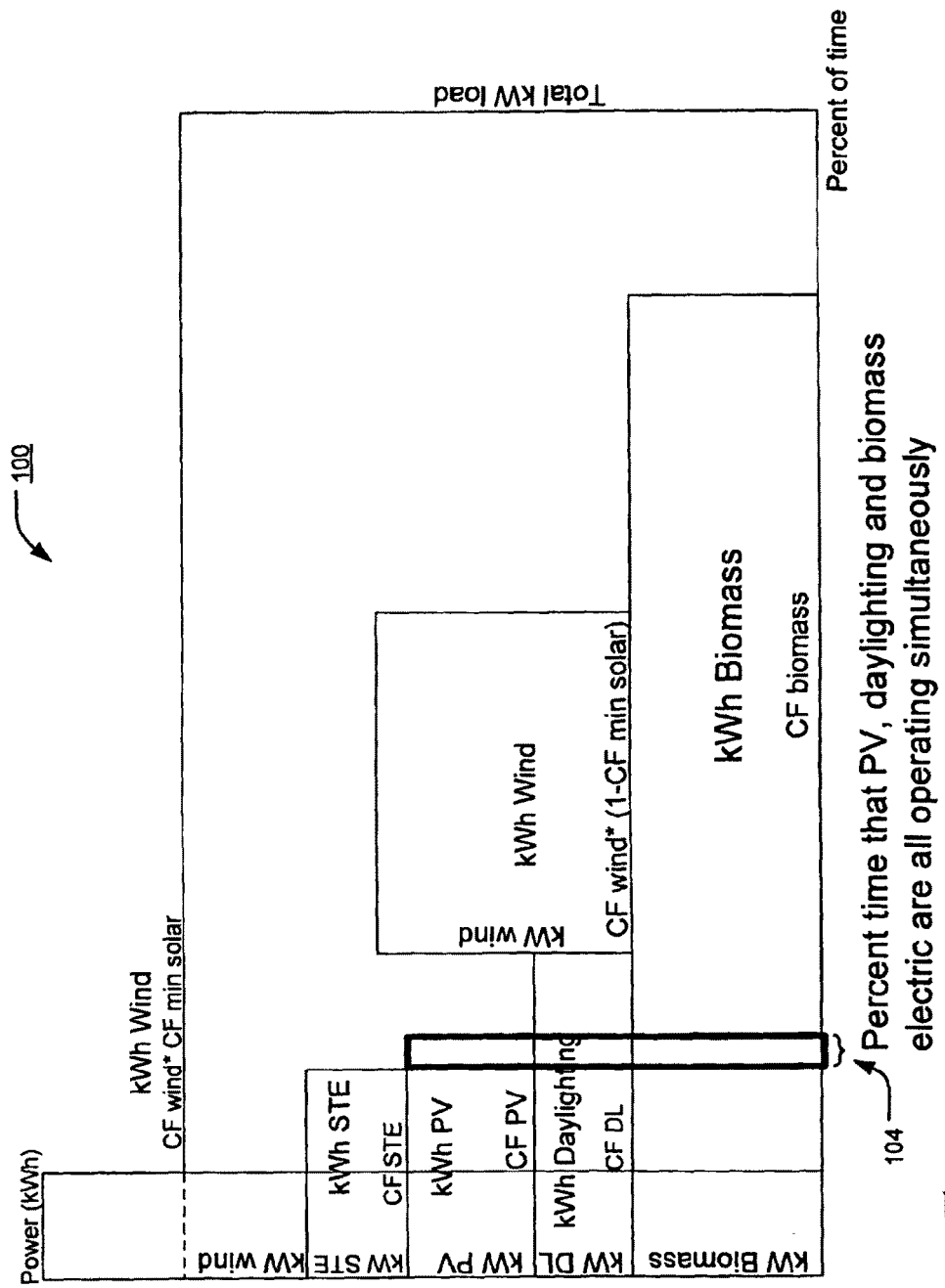
FIG. 5 is a graph like that of FIG. 2f highlighting a further portion thereof.

In FIG. 5; highlighted as area 104 is the percent of time that PV, daylighting and biomass electric are all operating simultaneously. This may also be represented as:

$$\text{hours}_{DL+PV+BM}=\text{MAX}(0,CF_{PV}*8760-[\text{hours}_{STE+PV+DL+BM}]-[\text{hours}_{W+STE+PV+DL+BM}])$$

Figure 6:
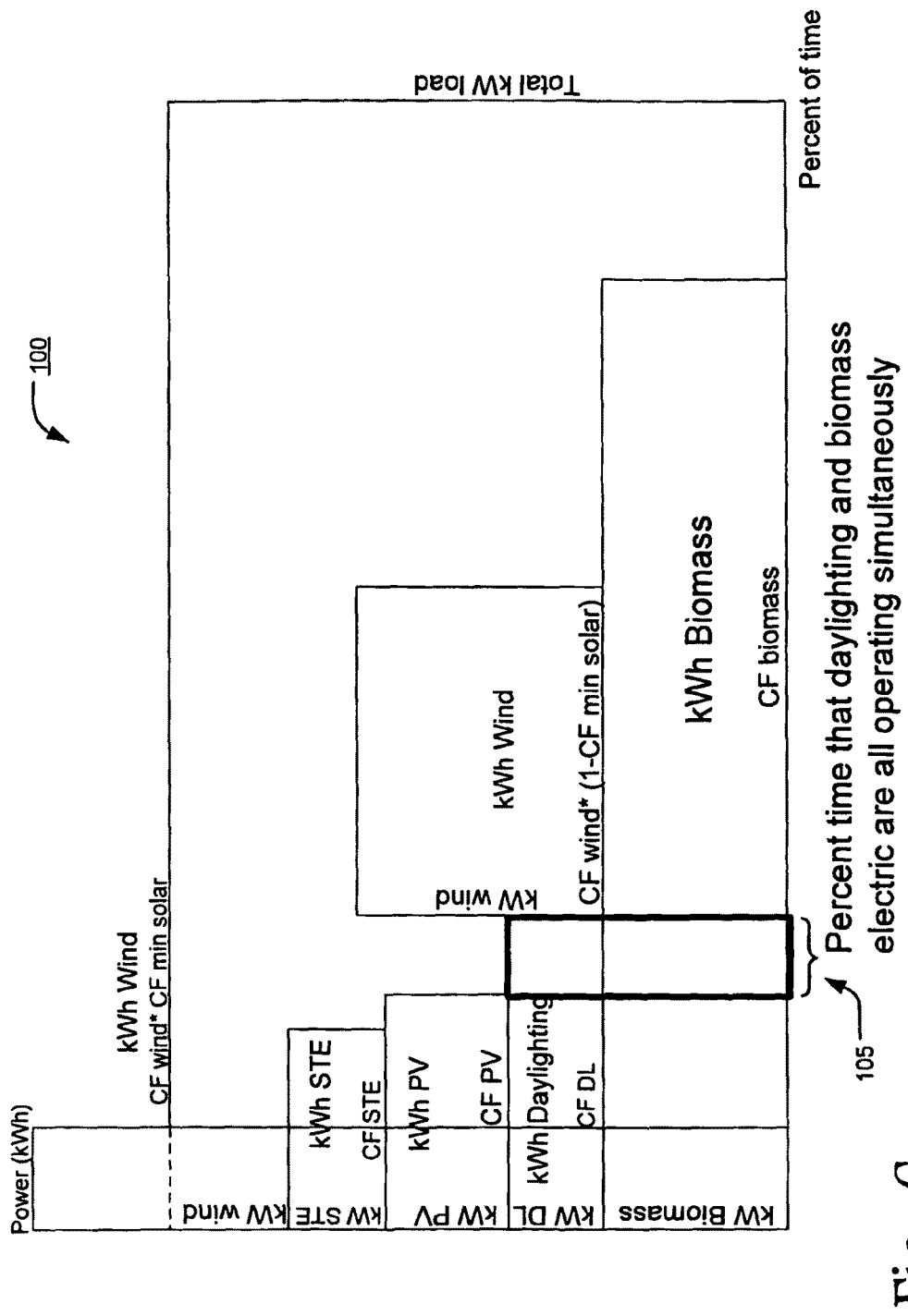
FIG. 6 is a graph like that of FIG. 2f highlighting a still further portion thereof.

In FIG. 6; highlighted as area 105 is the percent of time that daylighting and biomass electric are all operating simultaneously. This may also be represented as:

$$\text{hours}_{DL+BM}=\text{MAX}(0,2500-[\text{hours}_{PV+DL+BM}]-[\text{hours}_{STE+PV+DL+BM}]-[\text{hours}_{W+STE+PV+DL+BM}])$$

Figure 7:
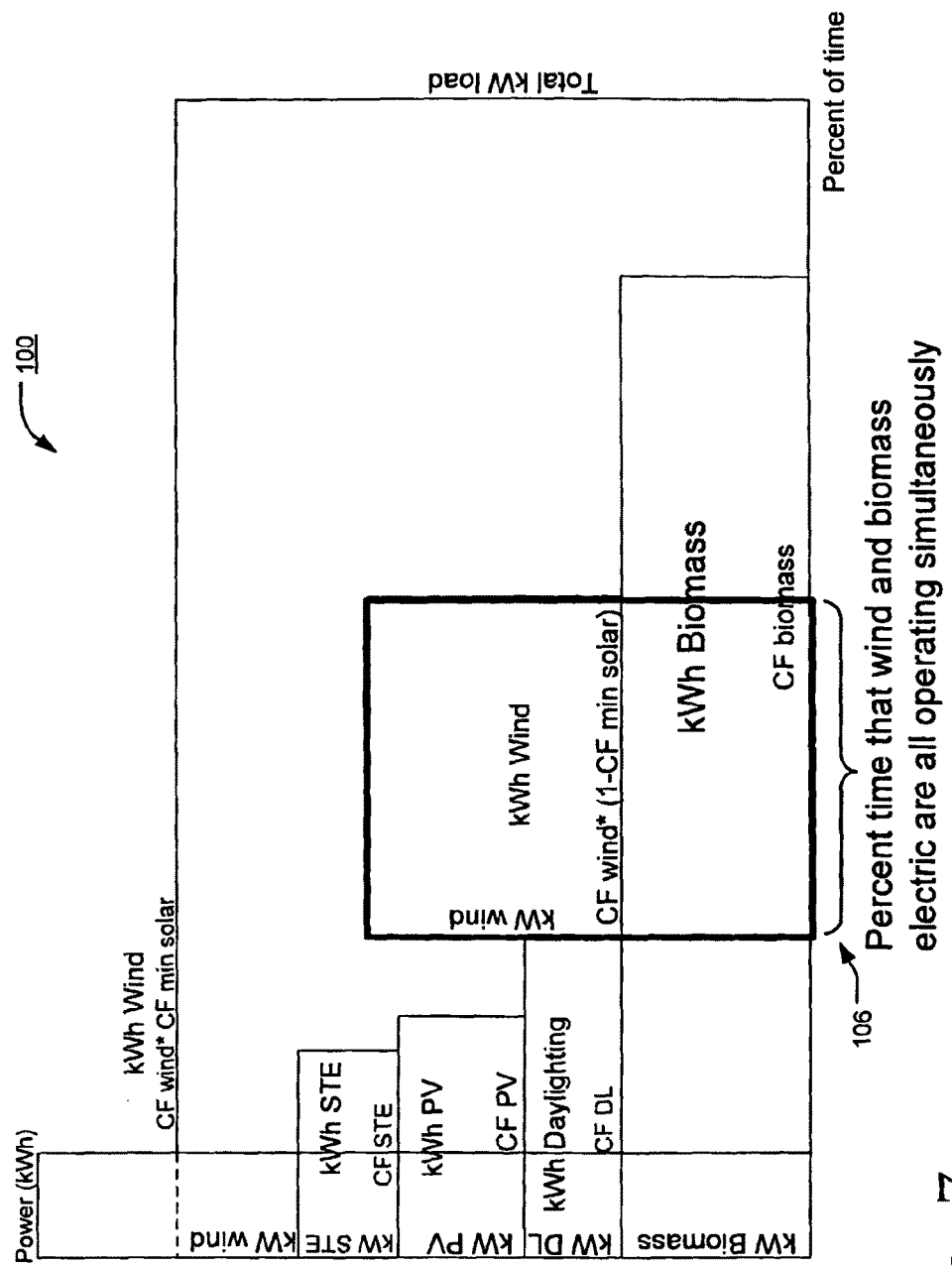
FIG. 7 is a graph like that of FIG. 2f highlighting yet another portion thereof.

In FIG. 7; highlighted as area 106 is the percent of time that wind and biomass electric are all operating simultaneously. This may also be represented as:

$$\text{hours}_{W+BM}=CF_{WIND}*8760*(1-((E_{PV}+E_{STE}+E_{DL})/(P_{PV}+P_{STE}+E_{DL}/(2500)+0.000001)/8760))$$

The above equation calculates the hours of time that wind is NOT coincident with photovoltaics, solar thermal electric and daylighting. The value 8760 is the total number of hours in a year. The average capacity factor of the solar technologies is calculated as $*((E_{PV}+E_{STE}+E_{DL})/(P_{PV}+P_{STE}+E_{DL}/(2500)+0.000001)/8760)$ and this is multiplied by the capacity factor of wind to approximate the percentage of the time that wind is coincident with the solar technologies. Then 1 minus this fraction is the fraction of time that wind power is generated NOT coincident with the solar technologies. The 0.000001 is just to keep it from dividing by zero while still allowing it to be negligibly small. Since no power rating (kW) is related to the daylighting, the power delivery associated with daylighting is estimated as $E_{DL}/(2500)$ based on a stipulated value of 2500 hours of sufficient daylight per year.

Figure 8:
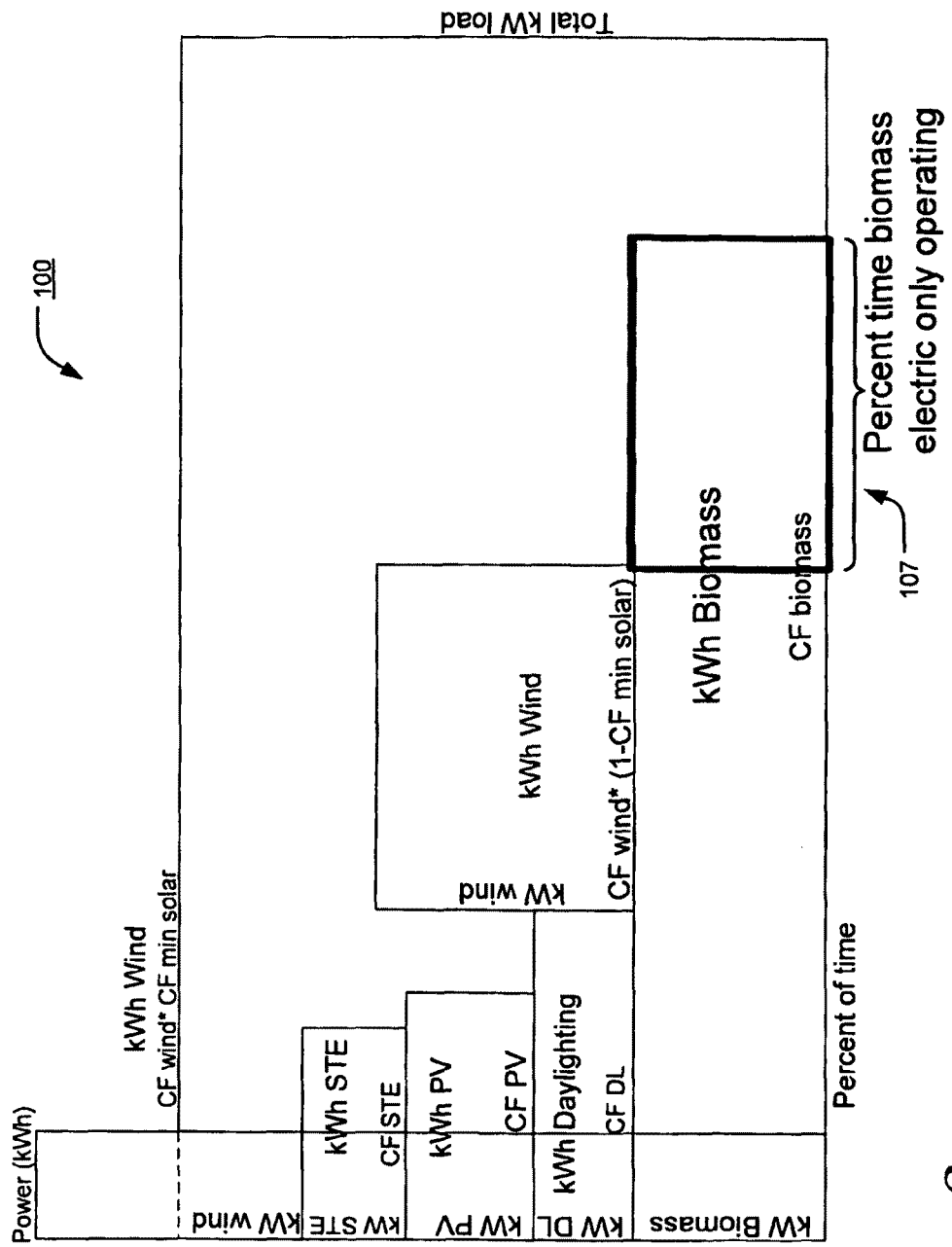
FIG. 8 is a graph like that of FIG. 2f highlighting yet one further portion thereof.

In FIG. 8; highlighted as area 107 is the percent of time that biomass electric only is operating. This may also be represented as:

$$\text{hours}_{biomass\ only}=\text{MAX}(0,CF_{BM}*8760-[\text{hours}_{W+BM}]-[\text{hours}_{STE+PV+DL+BM}]-[\text{hours}_{W+STE+PV+DL+BM}]-[\text{hours}_{PV+DL+BM}]-[\text{hours}_{DL+BM}])=\text{hours}_{BM}$$

Figure 9:
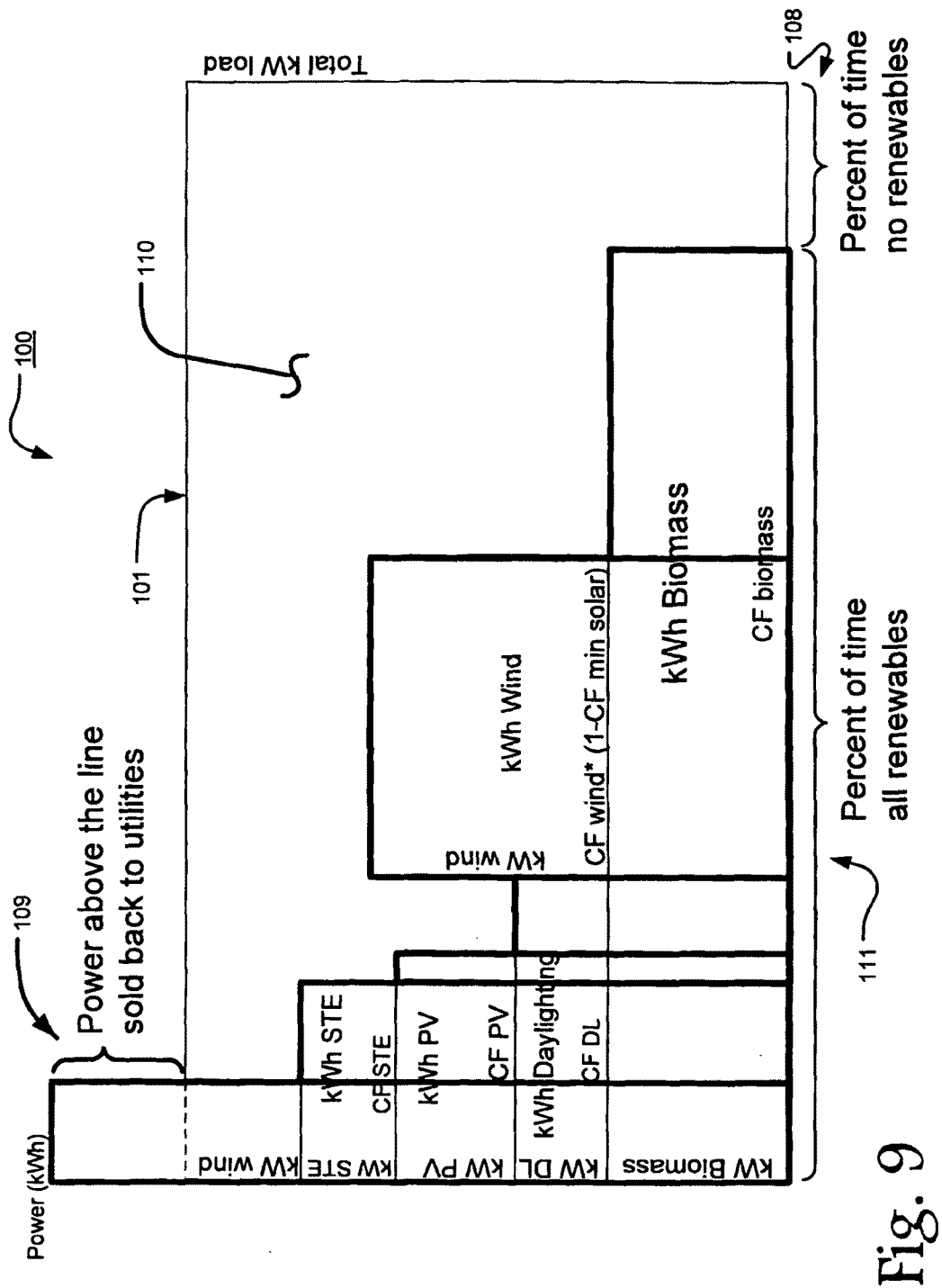
FIG. 9 is a graph like that of FIG. 2f highlighting yet still one further portion thereof.

In FIG. 9; highlighted as area 108 is the percent of time that no renewable energies are operating. This may also be represented as:

$$\text{hours}_{no\ renewables}=8760-[\text{hours}_{W+STE+PV+DL+BM}]-[\text{hours}_{STE+PV+DL+BM}]-[\text{hours}_{W+BM}]-[\text{hours}_{BM}]-[\text{hours}_{PV+DL+BM}]-[\text{hours}_{DL+BM}]$$

The annual hours of operation associated with each combination of renewable energy technologies has been calculated in the above equations. Now the Annual Utility Electric (kWh per year) may be calculated as the load minus the coincident capacity (kW) multiplied by the hours that the combination is operating, and added up over all the possible combinations of technologies; this combination area being identified as element 111, generally in FIG. 9, and with more specificity in FIG. 10. The "MIN(P, ... )" functions in the equation limit the electrical generation to the heat generating capacity of solar thermal electric and biomass. This calculates the amount of electric energy that must be provided by the utility when the renewable energy output is not sufficient to meet the load. In FIG. 9, this is represented by the area 110 of box 101 that is not filled by any renewable energy box; i.e., it is all the area outside the boxed areas 102-107 representing the contributions of renewable energy sources (this area 110 is also shown separated from the renewables in FIG. 10 for simplicity). In summary the Annual Utility electric (kWh per year) may be represented by the following (although alternative mathematical relations can be used to arrive at the same or substantially similar values):

Annual Utility Electric(kWh/year)=MAX(0,(LOAD/
8760$-(P_{PV}+P_{WIND}$+MIN($P_{STE}$,[Solar Heat
Delivery(therms/year)]*100000/3412*[Cogen
Efficiency]/(8760*[Boiler Capacity Factor]))+
MIN($P_{BM}$,[Biomass Boiler Size(M BTU/
H)]*1000000/3412*[Cogen Efficiency])+$E_{DL}$/
(2500))))*[hours$_{W+STE+PV+DL+BM}$]+MAX(0,
(LOAD/8760$-(P_{PV}$+MIN($P_{STE}$,[Solar Heat
Delivery(therms/year)]*100000/3412*[Cogen
Efficiency]/(8760*[Boiler Capacity Factor]))+
$E_{DL}$/(2500)+MIN($P_{BM}$,[Biomass Boiler Size(M
BTU/H)]*1000000/3412*[Cogen
Efficiency]))))*[hours$_{STE+PV+DL+BM}$]+MAX(0,
(LOAD/8760$-(P_{PV}+E_{DL}$/(2500)+MIN($P_{BM}$,[Bio-
mass Boiler Size(M BTU/H)]*1000000/3412*
[Cogen Efficiency]))))*[hours$_{PV+DL+BM}$]+MAX
(0,(LOAD/8760$-(E_{DL}$/(2500)+MIN($P_{BM}$,
[Biomass Boiler Size(M BTU/H)]*1000000/
3412*[Cogen Efficiency]))))*[hours$_{DL+BM}$]+
MAX(0,(LOAD/8760$-(P_{WIND}$+MIN($P_{BM}$,
[Biomass Boiler Size(M BTU/H)]*1000000/
3412*[Cogen Efficiency]))))*[hours$_{W+BM}$]+
MAX(0,LOAD/8760$-$MIN($P_{BM}$,[Biomass Boiler
Size(M BTU/H)]*1000000/3412*[Cogen Effi-
ciency]))*[hours$_{BM}$]+LOAD/8760*[hours$_{NO\ RENEWABLES}$]

Figure 10:
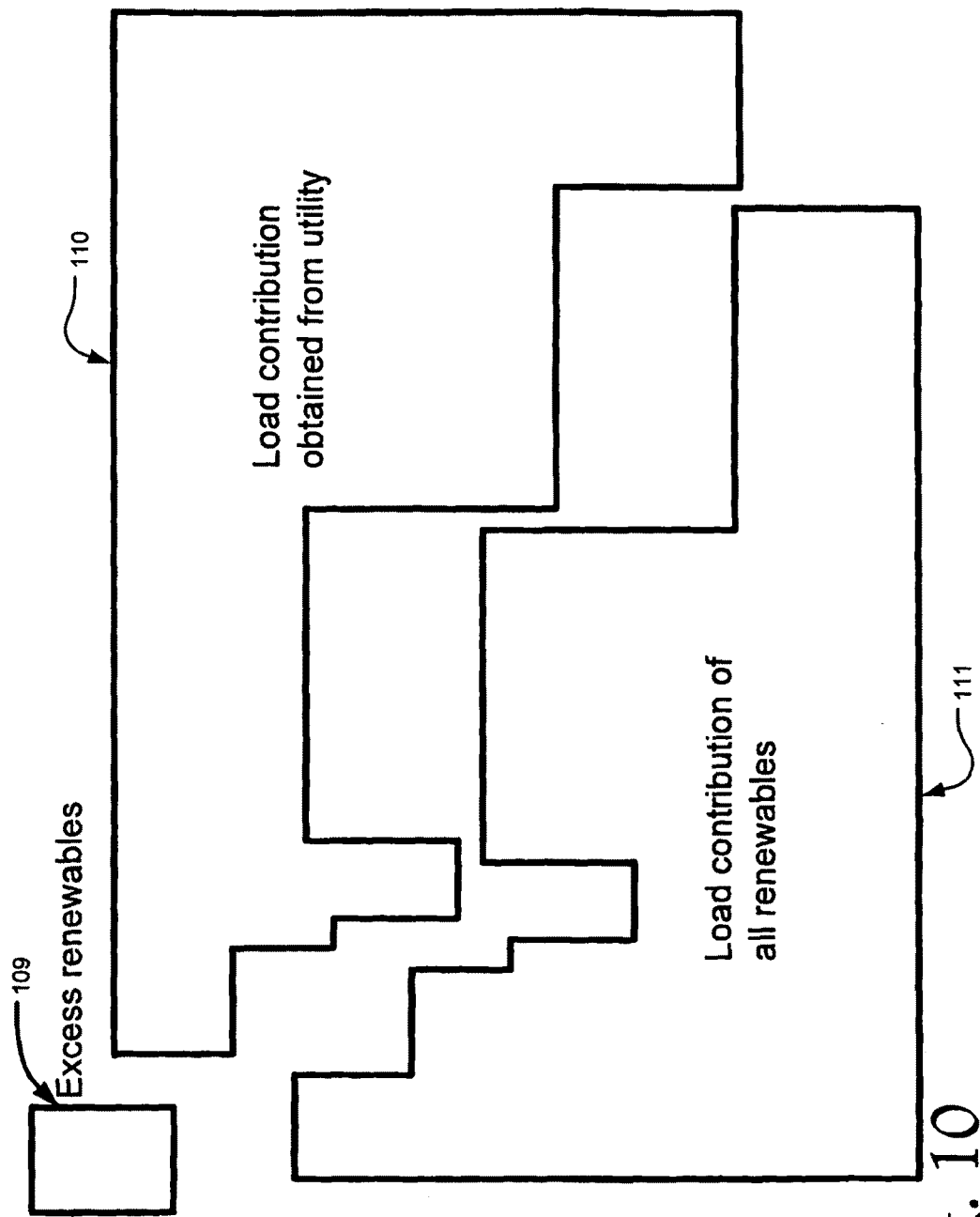
FIG. 10 is an exploded graph taken from graphs like those of FIGS. 2-9.

Power generated by the renewable energy technologies in excess of the load is sold back to the utility. In FIGS. 9 and 10, this is represented by the boxed area 109 above the line, which is renewable energy provided in excess of the demand. To calculate this, the load is subtracted from the renewable energy output of all simultaneous technologies. The "MAX (0, . . . " functions in the equation are to sum only renewable energy in excess of the load. The "MIN(P, . . . )" functions in the equation limit the electrical generation to the heat generating capacity of solar thermal electric and biomass. And, in further summary the Annual Sell-Back Electric (kWh per year) may be represented by the following (although alternative mathematical relations can be used to arrive at the same or substantially similar values):

Annual Sell-back Electric(kWh/year)=MAX(0,($-$
LOAD/8760$+(P_{PV}+P_{WIND}$+MIN($P_{STE}$,[Solar
Heat Delivery(therms/year)]*100000/3412*[Co-
gen Efficiency]/(8760*[Boiler Capacity Fac-
tor]))+MIN($P_{BM}$,[Biomass Boiler Size(M BTU/
H)]*1000000/3412*[Cogen Efficiency])+$E_{DL}$/
(2500))))*[hours$_{W+STE+PV+DL+BM}$]+MAX(0,($-$
LOAD/8760$+(P_{PV}$+MIN($P_{STE}$,[Solar Heat
Delivery(therms/year)]*100000/3412*[Cogen
Efficiency]/(8760*[Boiler Capacity Factor]))+
$E_{DL}$/(2500)+MIN($P_{BM}$,[Biomass Boiler Size(M
BTU/H)]*1000000/3412*[Cogen
Efficiency]))))*[hours$_{STE+PV+DL+BM}$]+MAX(0,($-$
LOAD/8760$+(P_{PV}+E_{DL}$/(2500)+MIN($P_{BM}$,[Bio-
mass Boiler Size(M BTU/H)]*1000000/3412*
[Cogen Efficiency]))))*[hours$_{PV+DL+BM}$]+MAX
(0,($-$LOAD/8760$+(E_{DL}$/(2500)+MIN($P_{BM}$,
[Biomass Boiler Size(M BTU/H)]*1000000/
3412*[Cogen Efficiency]))))*[hours$_{DL+BM}$]+
MAX(0,($-$LOAD/8760$+(P_{WIND}$+MIN($P_{BM}$,
[Biomass Boiler Size(M BTU/H)]*1000000/
3412*[Cogen Efficiency]))))*[hours$_{W+BM}$]+
MAX(0,$-$LOAD/8760+MIN($P_{BM}$,[Biomass
Boiler Size(M BTU/H)]*1000000/3412*[Cogen
Efficiency]))*[hours$_{BM}$]

In this way it is possible to calculate the energy sold back to the utility and the energy purchased from the utility to serve a load with a combination of different renewable energy technologies.

Thus disclosed is a method of characterizing annual energy delivery (kWh) of each technology as a rectangle of height proportional to the capacity (kW) of each renewable energy technology and the width proportional to the hours (h) that technology is delivering its rated capacity, having determined the energy delivery by other calculations. Note again that alternative calculation schemes for achieving energy delivery quantities may be used, whether by integration, or by direct data input or otherwise.

Alternatively disclosed is a method of stacking these rectangles according to their coincidence, in order of ascending capacity factor. The capacity factor is the percent of the time that a renewable energy technology is delivering it's rated capacity.

Further disclosed is a method of breaking the wind power rectangle into two rectangles of the same height (kW of wind power) but one with a width proportional to the average of the solar energy capacity factors and the other with a width equal to (1−the average of the solar energy capacity factors). The solar energy capacity factors are those of daylighting, photovoltaics, and solar thermal electric.

Moreover included is a method of integrating (summing the area under the curve) to determine power purchased from the utility and power sold back to the utility. The integration is performed by multiplying the sum of all renewable energy technologies that are generating simultaneously times the number of hours per year that these technologies occur simultaneously. For example if we only had wind and solar it would be the capacity (kW) of solar plus that of wind (kW) and times the hours that wind and solar occur simultaneously, plus the capacity of solar times the hours solar alone, plus the capacity of wind times the hours of wind alone. if the sum of all simultaneous technologies is greater than the load, then that greater portion is sold back to the utility.

EXAMPLE

The systems and methods hereof were used to determine the combination of renewable energy technologies that would provide 100% of the energy at a Zoological Park, the energy determined on an annual basis at the minimum life-cycle cost (100% indicating a zero energy goal in that the goal is to use zero public utility energy and 100% renewable energy). Results found appropriate implementation of several renewable energy measures integrated directly into buildings at the site (the site actually involving two sites considered together, the site thus including the zoo and a correspondeing research conservation park); particularly, PV, solar water heating, solar ventilation air preheating; but that central plant use of further renewables; particularly wind and biomass, needed implementation to meet the zero energy goal. Table 1 lists the sizes of each component that minimize life cycle-cost in this example. Note, the system and method hereof involved the use of generating the total load needing to be met, calculating the renewable energy available, comparing these values and then implementing new, additional and/or alternative renewable energy sources to achieve the goal.

TABLE 1

OPTIMAL SIZES OF EACH TECHNOLOGY
IN ZOO EXAMPLE

|  | Total |
|---|---|
| Photovoltaics Size (kW) | 862 |
| Wind Capacity (kW) | 14,500 |
| Solar Vent Preheat Area (ft2) | 18,730 |
| Solar Water Heating Area (ft2) | 9,715 |
| Biomass Gasifier Size (M Btu/h) | 10,996 |
| Biomass Cogeneration Size (kW) | 1,168 |
| Anaerobic Digester Size (FT3) | 4,182 |
| Anaerobic Digester Cogeneration Size (kW) | 12 |
| Daylight Aperture (Skylight) Area (ft2) | 27,697 |

Life-cycle costs are summarized in Table 2. The base case of continuing to purchase electricity, gas and propane has zero initial cost but high annual cost and a life-cycle cost of about $52 million. The net zero case has high initial cost of about $46 million but low annual cost and a life-cycle cost of about $74 million. Over a 25 year analysis period, the life cycle cost of the zero energy case is higher than the base case, but the life cycle-cost analysis does not include a dollar value for emissions, educational value, or other benefits associated with the zoo's zero energy goal.

TABLE 2

LIFE-CYCLE COST OF BASECASE AND ZERO ENERGY CASE IN ZOO EXAMPLE

| Name | Basecase Life Cycle Cost ($) | RE Case Life Cycle Cost ($) |
| --- | --- | --- |
| Initial Cost | $0 | $45,858,421 |
| O & M Cost | $0 | $13,135,266 |
| Biomass Fuel Cost | $0 | $5,762,545 |
| Gas Cost | $17,323,188 | $5,713,053 |
| Electric Cost | $34,914,085 | $7,196,488 |
| Production Incentives | $0 | −$2,887,806 |
| Total | $52,237,272 | $74,777,968 |

Figure 11:
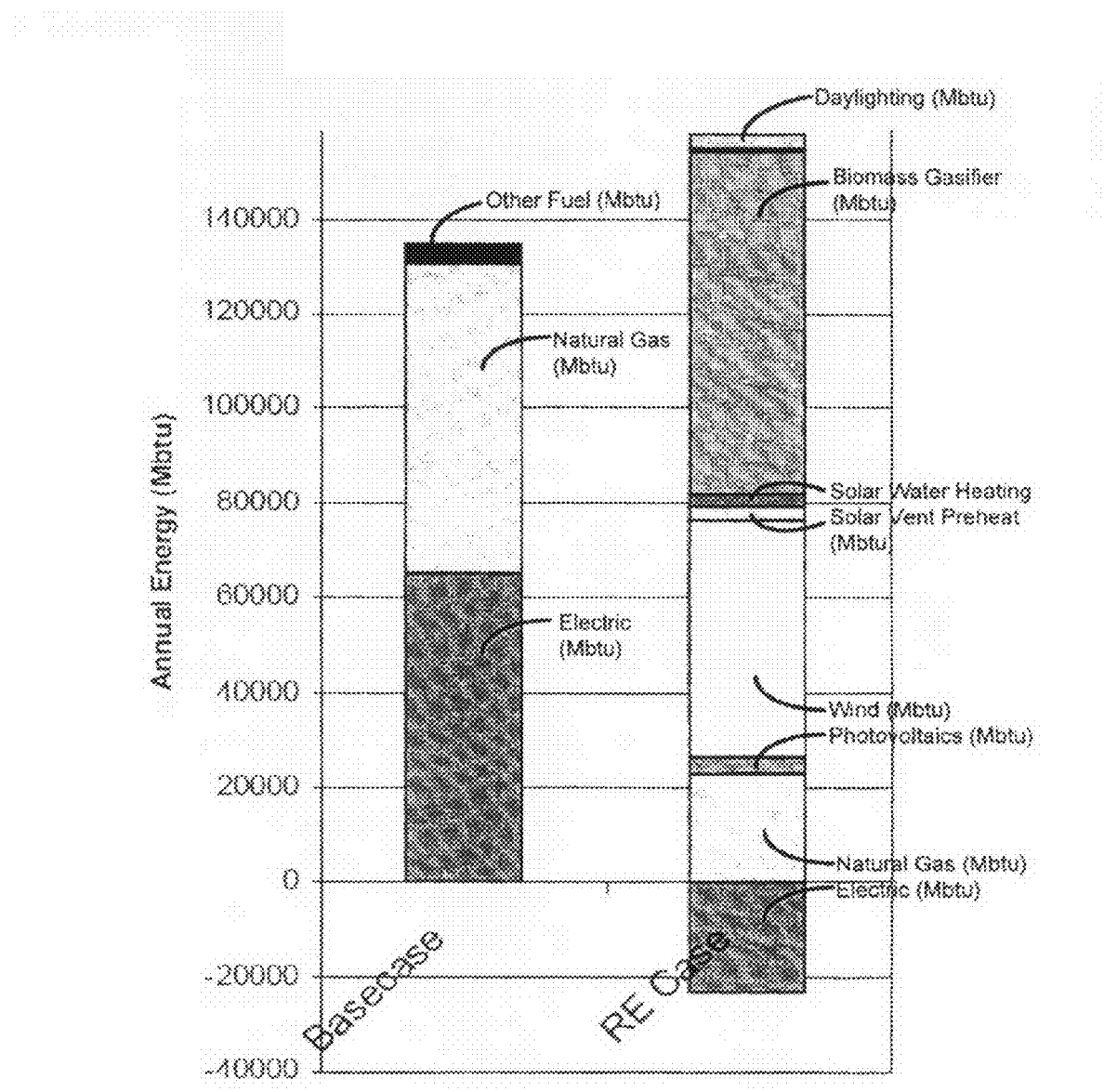
FIG. 11 is a graph of data from an exemplar use of a system and method hereof.

FIG. 11 provides a view of annual energy associated with each technology for the Example base case and zero energy case (i.e., renewable energy (RE) case). Specifically, FIG. 11 illustrates how the use of electricity, gas, and propane would be replaced by renewable energy (RE) sources in a Net Zero Facility; the base case is the use of only public utility energy (electricity and natural gas and some alternative fuels, e.g., other non-renewables, gas, oil or coal fired energy generation, inter alia); the RE case showing the implementation of alternative energy sources by the methods and systems hereof. The Example also specifically included the use of additional renewable energy sources: an anaerobic digester, a biomass combustion apparatus, and a solar thermal apparatus (not shown); however, their contributions were too small to be shown on the graph in FIG. 11. Extra electric generation at the site (shown below the zero axis in FIG. 11) was to offset remaining natural gas use at the Zoo site in this Example.

The system and/or method may now be used to evaluate alternatives, such as biodiesel instead of wood chips, in response to issues that emerge during energy supply and/or during the process of implementation. Moreover, the method and system provide for the implementation of one or more additional and/or alternative renewable energy sources, or change in size, structure or output of particular renewable sources in response to the generation of the total load and the renewable energy value contributing thereto. After/during comparison of these values, additional or alternative sources may be implemented. For example, alternative or additional biomass fuels may be engaged to increase the biomass contribution to the load, to better achieve the desired goal (whether of zero sum or merely a greater percentage) of renewable energy use at a site. For another example, perhaps the biomass generation could be determined to be run for greater periods of time, as for example during the night, as a result of the comparison of the total load and renewable energy calculations. Similarly, implementation of an alternative or additional solar system may be effected by and as a part of the methodology hereof; e.g., a larger or one or more additional photovoltaic array(s) can be engaged; a solar thermal electric system may be engaged; and/or additional wind turbines may be implemented. A variety of options may be implemented within the systems hereof. It may also be that such optimization involves selection of and between alternatives during use, such that a system/methodology hereof can implement greater wind source usage during good natural wind production days, and simultaneously effect a reduction in other renewable sources, such as biomass usage, during such times. Effecting such changes may take into account such issues of cost of biomass, and availability of wind or solar alternatives during such usage periods. Cost issues, which can be highly variable and depedent upon a number of factors, e.g., costs of different biomass fuels at different points in time bases upon any of a plurality of supply constraints, can be initially and/or continually evaluated for impact on the actual energy delivery; i.e., more or less energy from such sources may be delivered by the system in response to these developments.

In further applications of, like or together with the Example, it might first be understood that several organizations have established a variety of goals regarding renewable energy use. For example, the U.S. federal government has a goal of 7.5% renewable energy for its facilities. Green-building rating systems set percentage goals such as 2.5%, 7.5% and 12.5%. Further, some organizations have set the goal of "net zero" utility energy use for a facility (100% renewable) as was the goal in the case for the zoo of the Example above. Even so, and in view of this, other portions of an overall energy analysis and/or implementation system may include examining how to meet the goal, whatever it is, while potentially also attempting to or optimizing for minimizing life-cycle cost. Many organizations that operate real property need improved structured, credible, but affordable methods of and/or systems for identifying and prioritizing renewable energy projects prior to detailed evaluation/implementation.

The best mix of renewable energy technologies at a site may depend on: renewable energy resources; technology characterizations (such as installed cost, maintenance costs, efficiency); state, utility and federal incentives; and economic parameters (discount rate, inflation rates). Early in an implementation or planning process it can be desirable to keep the analysis simple and inexpensive, but each of these effects should be represented for the results to be useful. Previous screening efforts have evaluated each renewable energy technology independently, but here the interactions among multiple technologies at a site are accounted for.

Analysis can be conducted on a facility or site as a whole, or on each individual building at a facility or site. Solar water heating, solar ventilation preheating and daylighting are considered only to meet their associated end-use loads on individual buildings. Photovoltaics could be on a building or a central plant. Wind power, solar thermal electric, and the biomass energy alternatives are considered in a central plant arrangement if a facility has multiple buildings. Analysis can be performed by computer spreadsheets (as for example, MS Excel from Microsoft Corporation, Redmond Wash.), and can include an add-in optimizing functionality herein below referred to as "Premium Solver"). The following data sources may be used: customer-provided energy use and cost and building floor area at each site; geographic information system (also referred to as GIS) databases (such as that maintained by the National Renewable Energy Laboratory, or NREL, Golden Colo.); other databases such as utility rates (as for example from Plaits Inc.); City Cost Adjustment Factors (as for example from RS Means and Co.); and incentives (as from the Database of State Incentives for Renewable Energy maintained by University of North Carolina). Calculations may estimate the installed cost, incentives, energy performance, cost savings, and life-cycle cost. A calculation/comparison function based on capacity and capacity factor may be used to estimate the effect of simultaneous generation of multiple renewable energy technologies. An optimization solver may be used to identify the size of each component (kW of PV, kW of wind, square feet of solar thermal, etc.) that minimizes life-cycle cost. A constraint, such as percentage of energy use supplied by renewable energy, may be specified in the optimization.

The systems and methods hereof may be intended to use information that is readily available from an organization's real-property management database and utility procurement database, thus minimizing original data collection. At a minimum, the user would provide: the locations (names of facilities, street addresses) to be considered in the analysis; the square footage of building space; and annual utility use and cost (gas, electric, oil, propane, steam) for the previous year at each facility. A GIS utility may be used to convert the street addresses into GIS coordinates for use in the analysis. If the site provides an inventory of waste streams from the facility itself, this is considered in the biomass fuel assessment along with feedstocks from the surrounding area from the GIS data. If more detailed information is available, then any of the many default values in the analysis may be replaced with other information. Examples include a breakdown of types of floor space (office, warehouse, etc.), with different rates of ventilation air and lighting levels for each space, gallons per day of hot water, or other information regarding site energy use that may be available.

A geographic information system, GIS, is a computer-based system used to manipulate, manage, analyze, and display renewable energy resource data linked to a spatial reference. The National Renewable Energy Laboratory, NREL, maintains such datasets which may be used in this analysis, and may include solar radiation (W/m2) on a 40×40 km grid including global on the horizontal and on a tilt equal to local latitude, and beam radiation on tracking east/west axis. Wind power density (W/m2) is on a 200 m×1000 m grid for most locations, and a 25 km grid in locations where the high-resolution data are not available. Heating degree days and cooling degree days may also be included. GIS data layers can be recombined or manipulated and analyzed with other layers of information. For example, the energy delivery of solar ventilation air preheating may be estimated by the integral of solar resource on a vertical south wall and heating degree days at a location. Illuminance data for daylighting calculations may be selected from the closest city for which Typical Meteorological Year weather data is available. Utility cost data would usually be provided by the site under evaluation, but GIS data sets may additionally be obtained of residential, commercial, and industrial utility rates from Platts which could be used if data are not available from the site.

The GIS database may include biomass resource information from surrounding areas, reported as tons available within, e.g., a 50 mile radius. The breakdown of available biomass feedstocks may be as follows:

Crop residues (dry tonnes/year) include corn, wheat, soybeans, cotton, sorghum, barley, oats, rice, rye, canola, dry edible beans, dry edible peas, peanuts, potatoes, safflower, sunflower, sugarcane, and flaxseed from Unites States Department of Agriculture (USDA), National Agricultural Statistics Service, 2002 data.

Orchard and Grape prunings (dry tonnes/year) from USDA, 2002 data.

Forest residues (dry tonnes/year) from USDA, Forest Service's Timber Product Output database, 2002

Primary wood mill residues (dry tonnes/year) from USDA, Forest Service's Timber Product Output database, 2002.

Secondary wood mill residues (dry tonnes/year) from the U.S. Census Bureau, County Business Patterns, 2002 data.

Urban wood waste (dry tonnes/year) from U.S. Census Bureau, 2000 Population data, BioCycle Journal, State of Garbage in America, January 2004; and County Business Patterns 2002 data.

Methane emissions from landfills (tonnes/year) from EPA, Landfill Methane Outreach Program, 2003 data.

Methane emissions from manure management (tonnes/year) including: dairy cows, beef cows, hogs and pigs, sheep, chickens and layers, broilers, and turkey, from USDA, National Agricultural Statistics Service, 2002 data.

Methane emissions from domestic wastewater treatment (tonnes/year) from the EPA Inventory of U.S. Greenhouse Gas Emissions and Sinks: 1990-2003 and U.S. Census Bureau, 2000 Population data.

Usage of each of the renewable technologies used here may include technology characterizations, including e.g., initial cost, efficiency, and operation and maintenance cost which for each of the renewable energy technologies may be characterized according to the cost and performance data as for example, reported in edition four of the "Power Technologies Energy Data Book" from NREL (Golden Colo.) and also from "Renewable Energy Technology Characterizations" from Electric Power Research Institute. Other sources of information may also be employed.

The initial cost of each technology may be estimated from the technology characterizations, staff project experience, and cost estimating manuals. Costs are adjusted for the city cost adjustment factors for each location from RS Means and Co. The city cost adjustments are for composite project cost including both materials and labor. The initial cost may be reduced by any available incentives including the Federal Business Investment Tax Credit (% of cost); state tax credit (% of cost); and/or rebate ($/Watt or % of cost). Even though the Modified Accelerated Cost Recovery Schedule (accelerated depreciation) occurs over five years, it may be modeled here as an equivalent reduction in initial cost (10% as recommended by calculations by NREL).

Incentives that may be available at each location from state governments, utilities, or others are as listed in the Database of State Incentives for Renewable Energy maintained by University of North Carolina. Other NREL compilations have been made of the incentives available for each location into a spreadsheet that can be read by look-up functions.

Initial cost may be represented by the equation:

$$C = (c_{unit,electric} P_{rated,electric}) + (c_{unit,boiler} P_{rated,\ boiler}) + (c_{unit,storage} S_{rated,\ storage}) + (c_{unit,distribution} P_{rated,boiler})$$

where $c_{unit,electric}$=per-unit cost of installed electrical generating system ($/kW)

$P_{rated,electric}$=rated power (kW) output of electrical system $c_{unit,boiler}$=cost per-kW (or MBH) of solar thermal or biomass boiler $P_{rated,\ boiler}$=rated thermal output (kW, or MBH) of solar thermal or biomass boiler $c_{unit,storage}$=cost per kWh of thermal storage (e.g. tank)

$S_{rated,\ storage}$=capacity of thermal storage tank (kWh thermal)

$C_{unit,distribution}$=cost of system to distribute heat from plant to buildings (e.g. $250,000/MBH).

The initial cost may then be adjusted for any incentives that may be available as follows:

$$C_{after\ incentives}=(C*CCA-rebate)*(1-\text{federal tax credit})*(1-\text{state tax credit})$$

where,
C=installed cost of system ($)
CCA=city cost adjustment factor as for example from RS Means and Co. cost estimating manuals As introduced above, analysis may also be conducted using annual fuel and/or electricity savings as for example, including annual average load and resource information. Energy delivery may be calculated as a function of renewable energy resources based on annual-average efficiency models (energy delivery=resource*efficiency). For some loads, such as the manufacturing plants and breweries, this introduces little error since the load is essentially constant, but in some cases the error may be substantial. However, in most all cases, this tool is intended only to focus investment in site visits and detailed evaluation using hourly simulation or more sophisticated (and expensive) means of confirming both engineering and economic feasibility.

Energy savings may include savings in natural gas (or other fuel) and electricity. Natural gas savings would typically be limited to the minimum of 1) base case fuel use; or 2) renewable energy heat generating capacity. Electric savings may be limited to the facility average electric demand. Renewable energy generation above average demand is sold back to the utility and credited at a lower wholesale rate. Electric savings may be limited to: 1) the minimum of generator size (kW) or 2) in the case of solar thermal and biomass heat, limited to generating capacity of the plant multiplied by heat-to electric cogeneration efficiency. Thermal energy as a byproduct of electric generation may be added back into the gas savings but multiplied by a heat exchanger effectiveness.

For wind power the energy savings may be expressed as:

$$E_{s,\ electric,\ wind}=A_{swept}p_{wind}\eta_{wind}$$

where
$A_{swept}$=swept area of wind turbine (m2)
$p_{wind}$=annual average wind power density (W/m2)
$\eta_{wind}$=efficiency of wind turbine system.

For the solar photovoltaic and solar thermal options the equations may be:

$$E_{s,\ gas}=A_cI_{ave}\eta_{solar}365*(1-\eta_{cogeneration})*e_{hx}/\eta_{boiler}$$

$$E_{s,\ electric}=A_cI_{ave}\eta_{solar}365*\eta_{cogeneration}$$

where
$A_c$=solar collector area (m2)
$\eta_{solar}$=efficiency of solar electric system. For PV this is the efficiency of the PV panels times 0.77 to account for balance-of-system losses.
365 is the days/year
$I_{ave}$=average solar radiation (kWh/m2/day)
$\eta_{cogeneration}$ is the efficiency of the electric generator (zero for photovoltaics)
$e_{hx}$ is the effectiveness of the heat recovery heat exchanger
$\eta_{boiler}$=auxiliary heater efficiency.

Fuel savings delivered by the solar ventilation air preheating system, Es, gas, SVP, is calculated by the equation $$E_{s,\ gas,\ SVP}=A_c q_{useful}*(\text{\#days per week}/7)/\eta_{heating}$$

where
$\eta_{heating}$=heating system efficiency.

Biomass gas savings (therms/year) are the minimum of site gas use and thermal energy provided by the biomass boiler minus that converted to electricity, divided by heat recovery steam generator effectiveness.

Biomass electric delivery (kWh/year) is the minimum of electric energy generation as calculated by cogen capacity times capacity factor or as limited by boiler capacity, boiler efficiency, and boiler capacity factor. For the biomass energy alternatives, annual delivery of heat and electricity may be calculated as follows:

$$E_{s,\ gas,\ biomass}=P_{boiler}*\eta_{biomass\ boiler}*8760*CF_{boiler}(1-\eta_{cogeneration}+(1-\eta_{cogeneration})*e_{hx}/\eta_{gas\ boiler}$$

$$E_{s,\ electric,\ biomass}=P_{boiler}*\eta_{biomass\ boiler}*8760*CF_{boiler}*\eta_{cogeneration}$$

where
$P_{boiler}$=biomass boiler size (M Btu/h), a variable determined by the optimization
$\eta_{biomass\ boiler}$=efficiency of biomass boiler
$CF_{boiler}$=capacity factor (% of time operational)
$\eta_{cogeneration}$ is the efficiency of the electric generator
ehx is the effectiveness of the heat recovery heat exchanger
ηboiler=auxiliary heater efficiency.

In determining the annual utility cost savings, renewable energy delivered less than the site load may be credited at full retail value Es Ce. Power delivered in excess of the average load (kW) is credited an "avoided cost" (wholesale rate) Es Ce, avoided. Where
$C_e$=cost of utility energy ($/kWh)
$C_{e,\ avoided}$=avoided cost paid by utility for excess power ($/kWh).

One of the continually re-evaluated issues includes annual biomass fuel cost which would generally then effect how much this might be relied upon. The tons of biomass fuel used may be calculated as the boiler heat delivered for both process heat and cogen divided by boiler efficiency and divided by heating value of fuel. The radius to collect fuel (miles) may be calculated from the quotient of fuel required (tons) and density (tons/square mile) from the GIS database. The per-ton biomass fuel cost ($/ton) may be calculated as a fixed cost ($/ton) plus trucking cost ($/ton/mile). The biomass fuel cost ($/year) may then be the fuel used by the biomass energy plant minus fuel available onsite times fuel cost ($/ton).

Annual operation and maintenance costs may be calculated as a fraction of installed cost or as a multiplier on energy production (as reported in Edition 3 of the Power Technologies Energy Data Book, or other sources including staff project experience).

Production incentives may be calculated as the electrical energy delivery from each technology times the per-kWh incentive available for that particular technology. In most cases the production incentives are applied only to power provided to the utility. The cash flows associated with production incentives may not be escalated over time.

Life-cycle cost is calculated by adding initial cost to any annual costs discounted to their present value. Annual costs include maintenance, fuel (as in the case of biomass), standby charges from the utility, payments to the utility associated with the difference between retail and delivered power, and any production incentives or other cash flows. The user would specify the rate at which future costs are discounted to their present value. For the federal government this rate had been specified at 5% in 2007. A large corporation investing in their own facility may have something like a 7.5% time-value of money, and the rate may be much higher for third party investors or a small company struggling to make payroll. The effect of higher discount rates is to make the capital-intensive renewables more expensive in terms of life cycle cost.

Fuel escalation rate (according to census region and fuel type), and general inflation rate may also be from reference for federal projects, but given considerable uncertainty in these parameters, most users might be interested in and/or for results over a range of values, from, e.g., 2% to as high as, for example, 15%. It may be interesting that some corporations view a 15% fuel escalation rate not only out of academic interest, but as rates that are actually possibly that high in coming years.

$$LCC = C_{initial} + (S_{energy} - C_{O\&M} - C_{biomass\ fuel}) pwf_{25} + (S_{prodincentive}) pwf_{prod\ incentive}$$

where
LCC=life cycle cost
$C_{initial}$=initial cost of renewable energy system
$S_{energy}$=annual savings in electricity and natural gas purchased from utility
$C_{O\&M}$=annual cost of operating and maintaining renewable energy systems
$C_{biomass\ fuel}$=annual cost of delivering biomass fuel to the site
$pwf_{25}$=present worth factor for future savings stream, (e.g. 17.41 years for 25 year lifetime and discount rate specified by NIST for 2005).
$S_{prod\ incentive}$=annual revenue from production incentive
$pwf_{prod\ incentive}$=present worth factor associated with the term of the production incentive.

These developments can then be used in the overall annualized determinations described above relative to FIGS. 2-10 and in the Example.

A further optimization technique may additionally be employed. An objective of an optimization problem may be to minimize life-cycle cost. A spreadsheet (e.g., MS Excel) may be prepared to estimate the cost and savings associated with each renewable energy measure and the life cycle cost for energy use at each facility. A computer program also referred to as "Premium Solver" from Frontline Systems Inc was then used to adjust each of the 15 variables to minimize life-cycle cost: 1) kW of PV; 2) kW of wind power; 3) square feet of solar ventilation air preheating; 4) square feet of solar water heating; 5) square feet of solar thermal (parabolic troughs); 6) kW of solar thermal electric; BTU/hour of biomass boiler capacity for 7) combustion, 8) gasification, 9) pyrolysis, 10) anaerobic digestion; kW of biomass electric for 11) combustion, 12) gasification, 13) pyrolysis, 14) anaerobic digestion; and 15) square feet of daylighting aperture for each type of space.

Figure 12:
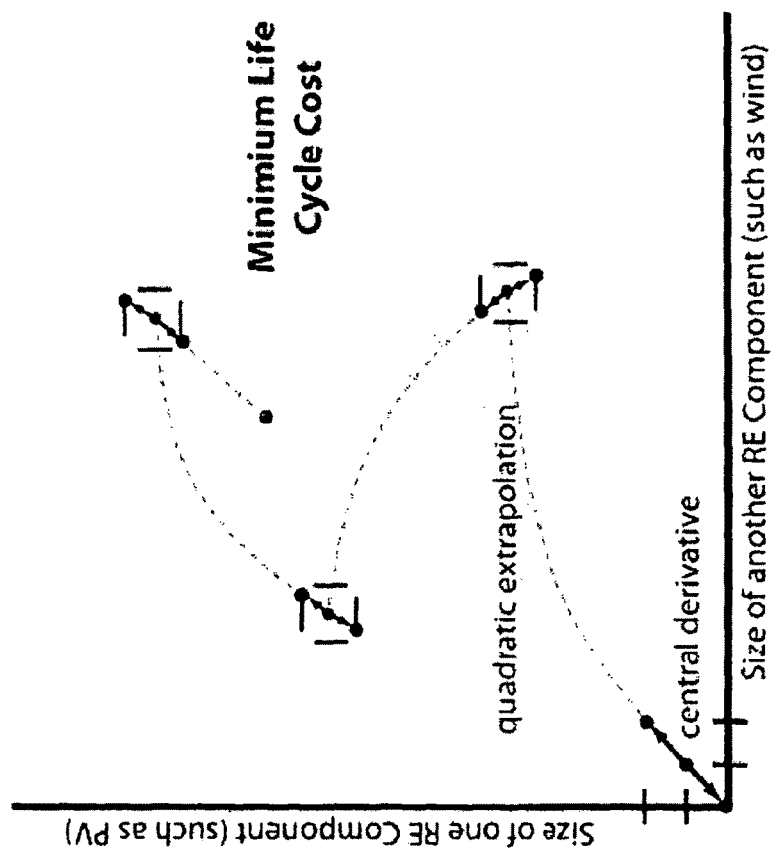
FIG. 12 schematic representation in graphical form of an optimization routine which may be used herewith.

Although the solver routine may be used to find the minimum Life Cycle Cost in 15 to 16 variables, only two variables can be illustrated in a two-dimensional figure, as in FIG. 12. An increase and decrease in the size of each renewable energy component is used to indicate direction of reducing life cycle cost. As shown in FIG. 12, the solver routine calculates the change in life-cycle cost associated with a change in the size of each of the renewable energy technologies, and then moves in the direction of decreasing life-cycle cost by an amount determined by a quadratic approximation. The solver routine involved the following parameters—precision: value of energy use 0.0+/−0.0001; convergence: change in life-cycle cost less than $0.0001 for five iterations; quadratic extrapolation to obtain initial estimates of the variables in one-dimensional search; central derivatives used to estimate partial derivatives of the objective and constraint functions; and Newtonian Search Algorithm used at each iteration to determine the direction to search.

Figure 13:
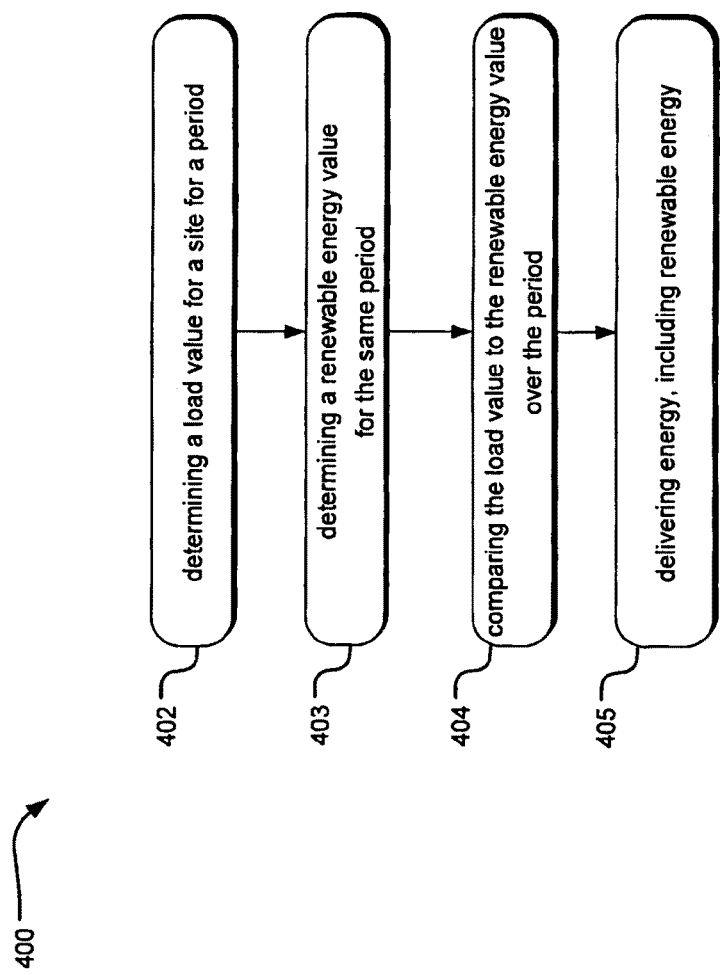
FIG. 13 is a schematic flowchart of an exemplary method hereof.

FIG. 13 provides a flow of method 400 hereof, which in some implementations, may be a computer-implemented method, for delivery of renewable energy to a site, the method generally including; determining a load value for a site for a period (operation 402); determining a renewable energy value for the same period (operation 403); comparing the load value to the renewable energy value over the period (operation 404) and, delivering a renewable energy to the site (operation 405).

Generally, the determination of a load value is of a total load value for the period, typically averaged, to a level for simplicity in use. This number/value may be based on a number of inputs, as for example the usage in a previous period, as for example in the previous year. This then may also be referred to as the load to be met, whether by a utility or other non-renewable source, or it may be met by a renewable or a combination of renewable sources with or without the utility contribution. Thus, it may include determining the load to be met with a combination of utility and on-site (or other) renewable energy measures. The second step of determining the renewable energy value might also include not just absolute values, but values based upon a power or capacity rating (e.g. averaged kW capable of being produced) and a percentage of period available, also referred to herein as a capacity factor, CF. This could involve the fraction of the time interval under consideration that renewable energy systems deliver their rated capacity, based on analysis of the technology and the underlying resource (determine the "capacity factor" for each type of renewable energy technology). Thus, the determining of a renewable capacity could thus include the determining of what percentage of the period (e.g., what part of a year, if annualized) the renewable is capable of producing. An example includes solar energy systems which without sufficiently elaborate storage means are not capable of production during non-daylight hours, thus, are only capable of production during a period of a day or longer.

The comparison operation may include not just total values, but, also calculations of the power required from the utility and the power delivered back to the utility. Based on the capacity factors and the coincidence of the resources (solar occurs only during the day, wind and biomass generation may occur day or night), calculations of the power required from the utility and the power delivered back to the utility within the time interval under consideration (generally one year but could also be one month, day, or hour) can thus be made. Lastly, the delivery of the energy may include a variety of parts, including e.g., decision-making, which may be automated as described, regarding types of renewables to use, installation and/or dispatch of installed renewable energy systems to meet the load. The delivery of the energy may further include determinations of the size of each renewable energy measure; and this may include determinations involved in minimizing life cycle cost and/or developing an economically optimal combination of renewable energy technologies to meet the load. Use the cash flows associated with the exchange of power with the utility, to and from, may be included in the life cycle cost, and optimization in either or both installation and/or dispatch of particular renewable energy systems during use and/or implementation.

Note, this is generally more than mere calculations for the energy used by the load (kWh) and subtraction therefrom of the energy delivered by the renewables (kWh) to calculate how much energy had to be provided by the utility (kWh). Such simplicity can cause some results which do not agree with subsequent analyses based on more detailed hourly simulation. However, here, in contrast, there is a break down into power capacity, e.g., kW, and hours and taking together the realization that as more and more renewable energy equipment is added, the renewable capacity (kW) is certainly increased, but the hours that the renewagle energy, aka, RE, system delivers energy are not increased. The "Capacity Factor" captures this percentage of the time that the RE system is delivering it's rated capacity. (For example, a 1 kW photovoltaic, PV, system that delivers energy 6 hours per day has only a 25% capacity factor, i.e., being operational only 25% of a day; and, if the power capacity is increased to 2 kW, it is still only generating 6 hours per day—so there remains a need for some power to be obtained from the utility the other 18 hours of the day/night (without adequate battery storage, e.g.); and, there will continue to be need for obtaining power from other sources, e.g., a utility no matter the increase in capacity (barring good storage), to account for those remaining 18 hours). Prior to these developments, only very cumbersome hourly analyses could begin to account for the off-time power situation. The capacity factor provides straightforward analyses for determining or estimating how much power needs to be provided by the utility, and provides for implementation not of merely one renewable, but also for additions of more than one type of RE technology, even though this may appear complicated.

The method may further include optimizing the energy delivery, as in optimizing the renewables relative to the load, and/or optimizing them relative to each other; and/or establishing parameters as one of baseline, non-renewables for comparison or intermediately delivered energy and changes which may be desired for further energy deliver during the period. The method may further include using a user interface having at least a display portion; particularly in some instances wherein the display portion includes a display of energy delivery, either of total load, non-renewable energy delivered and/or renewable energies delivered. It may alternatively further include receiving user input information; and/or wherein the user input information includes information to increase optimization of renewable energy delivery.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The developments hereof may include computer hardware as and/or providing for the determinations and/or comparisons of information according to the methods hereof. A connection may be made between the computer systems and the energy delivery apparatus, whether renewable or non-renewable, and/or may include communications to other systems controlling such energy delivery systems. In some instances, the computer system or systems may provide means for calculating, determining and/or comparing as understood herein.

Figure 14:
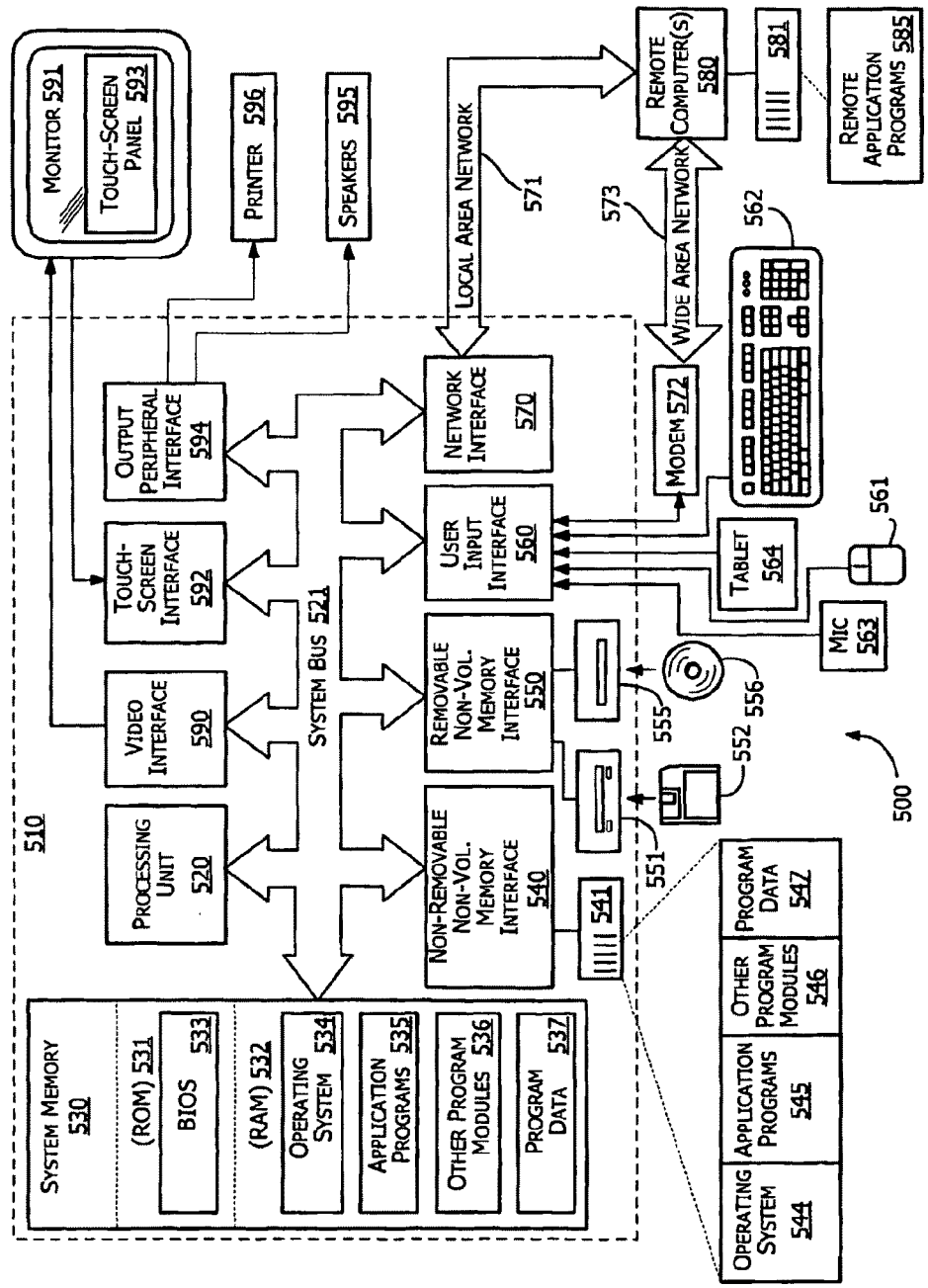
FIG. 14 is a schematic representation of one or more computer systems which may be used herewith.

Example hardware and an operating environment are shown in FIG. 14 for implementing the technology hereof, these including a computing system 500 including a general purpose computing device in the form of a computer 510, including a processing unit 520, a system memory 530, and a system bus 521 that may operatively couple to and/or with various system components including the system memory to the processing unit 520. There may be only one or there may be more than one processing unit 520, such that the processor of computer 510 comprises a single central-processing unit (CPU), or a plurality of processing units, commonly referred to as a parallel processing environment. The computer 510 may be a conventional computer, a distributed computer, or any other type of computer; the developments hereof are not so limited.

The system bus 521 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 531 and random access memory (RAM) 532. A basic input/output system (BIOS) 533, containing the basic routines that help to transfer information between elements within the computer 510, such as during start-up, is stored in ROM 531. The RAM 532 also includes the operating system 534, application programs 535, other module programs 536 and program data 537. The computer 510 may further include a hard disk drive 541 for reading from and writing to a hard disk, not shown, a magnetic disk drive 551 for reading from or writing to a removable magnetic disk 552, and an optical disk drive 555 for reading from or writing to a removable optical disk 556 such as a CD ROM or other optical media. The hard disk drive 541, magnetic disk drive 551, and optical disk drive 555 are connected to the system bus 521 by a hard disk drive interface 541, also referred to as a non removable, non-volatile memory interface 540, a magnetic disk drive interface 551, and an optical disk drive interface 555 also collectively referred to as a removable non volatile memory interface 550. The drives and their associated computer-readable media provide non-volatile storage of computer-readable instructions, data structures, program modules and other data for the computer 510, It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk 541, magnetic disk 552, optical disk 556, ROM 531, or RAM 532, including an operating system 544, one or more application programs 545, other program modules 546, and program data 547. A user may enter commands and information into the personal computer 510 through input devices such as a keyboard 562 and pointing device 561. Other input devices may include a microphone 563, tablet 564 or other input devices (not shown) such as a joystick, game pad, satellite dish, scanner, or the like. These and other input devices are often connected to the processing unit 520 through a serial port, or user input interface 560 that is coupled to the system bus 521, but may be connected by other interfaces, such as a parallel port, game port, or a universal serial bus (USB). A monitor 591 or other type of display device is also connected to the system bus 521 via an interface, such as a video adapter or video interface 590. The monitor 591 may include a touch screen panel 593, which may be connected to the bus 521 via a touch screen interface 592. In addition to the monitor, computers typically include other peripheral output devices, such as speakers 595 and printers 596, these being connected to the bus 521 via an output peripheral interface 594.

The computer 510 may operate in a networked environment using logical connections to one or more remote computers, such as remote computer 580. These logical connections are achieved by a communication device coupled to or a part of the computer 510; the invention is not limited to a particular type of communications device. The remote computer 580 may be another computer, a server, a router, a network PC, a client, a peer device or other common network node, and typically includes many or all of the elements described above relative to the computer 510, although only a memory storage device 581 with remote programs 585 has been illustrated in FIG. 14. The logical connections depicted in FIG. 14 include a local-area network (LAN) 571 and a wide-area network (WAN) 573. Such networking environments are commonplace in office networks, enterprise-wide computer networks, intranets and the Internet, which are all types of networks.

When used in a LAN-networking environment, the computer 500 is connected to the local network 571 through a network interface or adapter 570, which is one type of communications device. When used in a WAN-networking environment, the computer 500 typically includes a modem 572, a network adapter, a type of communications device, or any other type of communications device for establishing communications over the wide area network 573. The modem 572, which may be internal or external, is connected to the system bus 521 via the User Input interface 560. In a networked environment, program modules depicted relative to the personal computer 510, or portions thereof, may be stored in the remote memory storage device. It is appreciated that the network connections shown are examples only and other means of and communications devices for establishing a communications link between the computers may be used.

In an example implementation, a establishing module individualized physical fitness parameters, an obtaining physical fitness data module, and a developing of a regimen module, and/or other modules may be incorporated as part of the operating system 534/544, application programs 535/545, or other program modules 536/546. Transaction logs, enlistment records, and other data may be stored as program data 537/547.

The technology described herein may be implemented as logical operations and/or modules in one or more systems. The logical operations may be implemented (1) as a sequence of processor-implemented steps executing in one or more computer systems and/or (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:

1. A site load energy system for the delivery of energy to a load at a site, at least a portion of the energy being delivered by one or more of a plurality of renewable energy technologies, the system including:
   a site load for presenting a consumptive energy demand;
   a connection of the site load to a source of non-renewable energy for contribution to meeting the consumptive energy demand of the site load;
   a renewable energy sub-system connected to the site load for delivery of renewable energy in contribution to meeting the consumptive energy demand of the site load, the renewable energy sub-system also having a off-load connection to deliver any energy in excess of the demand to an off-load element;
   a hardware sub-system for obtaining a load value and a renewable energy value for the site load for a period of power delivery, including obtaining a rated capacity for the renewable energy source and a a capacity factor calculated as a percent of the period of power delivery during which the renewable energy sub-system is delivering the renewable energy at the rated capacity;
   and for comparing the load value to the renewable energy value over the period using the rated capacity factor for the renewable energy sub-system to meet, exceed or fail to fully meet the demand of the load, the hardware sub-system providing for one or more of delivery of renewable energy to the sight load, and the delivery of excess renewable energy generated to an off-load element.

2. A system according to claim 1 further including apparatus implementing one or more of installation, dispatch and engagement of one or more of new, additional or alternative sources of renewable energy.

3. A system according to claim 1 wherein the hardware sub-system provides one or both of determining how much of the load value is served directly by the renewable energy systems and how much is acquired from the non-renewable source; and effecting usage of non-renewable acquired energy during a period; and, determining how much renewable energy is generated in excess of the load, and effecting a transfer or sale back to a utility of excess energy generated by renewable sources.

4. A system according to claim 1 including one or more of renewable energy sources from the group consisting of:biomass, solar and wind.

5. A system according to claim 4 wherein the solar energy source includes one or more of photovoltaics, solar thermal electric, and day lighting.

6. A system according to claim 1 wherein the hardware sub-system is computer hardware.

7. A system according to claim 1 wherein the renewable energy sub-system includes one or more of a photovoltaic array, a wind turbine, and a biomass cogeneration facility.

8. A method for using a system for the delivery of energy to a site using one or more of multiple renewable energy technologies based on a renewal resources as set forth in claim 1; the method including
   calculating the load required by the site for the period;
   calculating the amount of renewable energy for the period, including obtaining a rated capacity for a renewable energy source and a capacity factor calculated as a percent of the period of power delivery during which the renewable energy sub-system is delivering the renewable energy at the rated capacity;
   comparing the total load to the renewable energy available; and
   implementing one or both of additional and alternative renewable energy sources for delivery of energy to the site.

9. A method according to claim 8 wherein one or more of the load values and the renewable energy values one or both of respective capacities over periods of time determined portions over an annualized period.

10. A method according to claim 8 wherein the total load value and the one or more renewable energy values are determined as respective capacities over periods of time and can be represented as respective boxes in a graph of capacity versus time.

11. A method according to claim 10 wherein the one or more renewable energy values are determined by multiplying the sum of the capacities of all renewable energy technologies that are generating simultaneously times the number of hours per year that these technologies occur simultaneously.

12. A method according to claim 11 wherein the one or more renewable energy values are wind and solar, and the values are determined by multiplying the capacity (kW) of solar plus that of wind (kW) and times the hours that wind and solar occur simultaneously, plus the capacity of solar times the hours of solar alone, plus the capacity of wind times the hours of wind alone.

13. A method according to claim 12 wherein one or the other of: if the sum of all simultaneous technologies is less than the load, that portion less is acquired from a non-renewable source, and if the sum of all simultaneous technologies is greater than the load, that portion greater is delivered to an off-load element.

14. A method according to claim 8 wherein the power of the renewable energy over periods of time are determined as one or both of integrating or summing the total power for the load for the period.

15. A method according to claim 8 wherein the power of the renewable energy over periods of time are determined as one or both of $$\text{Energy} = (T*L) - ((T*CF)*\text{Min}(L, P_{RE})); \text{ or}$$

$$\text{Energy} = ((T*CF)*\text{Max}(L, P_{RE})) - ((T*CF)*L);$$

wherein, T=Time; CF=Capacity Factor, L=Load, and $P_{RE}$=Power capacity of the renewable energy.

16. A method according to claim 8 wherein the respective renewable energy values are stacked according to their coincidence, in order of ascending capacity factor.

17. A method according to claim 8 wherein the renewable energy values include one or more of: solar energy, wind energy and biomass energy.

18. A method according to claim 17 wherein a wind power representation is broken into two rectangles of the same height (kW of wind power) but one with a width proportional to the average of the solar energy capacity factors and the other with a width equal to 1−the average of the solar energy capacity factors, the solar energy capacity factors including one or more of daylighting, photovoltaics, and solar thermal electric.

* * * * *